US012290837B2

(12) United States Patent
Xiang et al.

(10) Patent No.: US 12,290,837 B2
(45) **Date of Patent: *May 6, 2025**

(54) RADIATION AND HIGH-TEMPERATURE TOLERANT PIEZOELECTRIC ULTRASONIC CONTACT TRANSDUCER WITH MOUNTING ASSEMBLY

(71) Applicant: X-Wave Innovations, Inc., Gaithersburg, MD (US)

(72) Inventors: Dan Xiang, Gaithersburg, MD (US); Uday Singh, Gaithersburg, MD (US)

(73) Assignee: X-Wave Innovations, Inc.

( * ) Notice: Subject to any disclaimer, the term of this patent is extended or adjusted under 35 U.S.C. 154(b) by 545 days.

This patent is subject to a terminal disclaimer.

(21) Appl. No.: 17/726,489

(22) Filed: Apr. 21, 2022

(65) Prior Publication Data

US 2022/0241819 A1 Aug. 4, 2022

Related U.S. Application Data

(63) Continuation-in-part of application No. 16/528,581, filed on Jul. 31, 2019, now Pat. No. 11,620,973.

(51) Int. Cl.

| | |
|---|---|
| ***B06B 1/06*** | (2006.01) |
| ***G01H 11/08*** | (2006.01) |
| ***G10K 11/00*** | (2006.01) |
| ***G10K 11/36*** | (2006.01) |

(52) U.S. Cl.

CPC .................................. *B06B 1/0651* (2013.01)

(58) Field of Classification Search

CPC .................................................... B06B 1/0651

USPC .......................................................... 310/334

See application file for complete search history.

(56) References Cited

U.S. PATENT DOCUMENTS

| | | | |
|---|---|---|---|
| 3,781,576 | A | 12/1973 | Runde |
| 4,505,160 | A | 3/1985 | Zacharias, Jr. |
| 4,567,770 | A | 2/1986 | Rumbold |
| 4,703,656 | A | 11/1987 | Bhardwaj |
| 4,783,997 | A | 11/1988 | Lynnworth |
| 5,195,373 | A | 3/1993 | Light |

(Continued)

FOREIGN PATENT DOCUMENTS

WO 2012/145479 A1 10/2012

OTHER PUBLICATIONS

Prathamesh N. Bilgunde and Leonard J_ Bond, "High Temperature Ultrasonic Immersion Measurements Using a BS-PT Based Piezoelectric Transducer Without a Delay Line", AIP Conference Proceedings 1949, 100003 (2018).

(Continued)

*Primary Examiner* — Daniel L Murphy
(74) *Attorney, Agent, or Firm* — Kendal M. Sheets

(57) ABSTRACT

The embodiments disclose an ultrasonic transducer that can require a piezoelectric element attached to the transducer to be constantly under high pressure, and this required pressure can be provided and maintained by the transducer's design at all temperatures during its operation. The exemplary ultrasonic transducer can eliminate a failure of the bond between the piezoelectric element and a delay block by using the mechanical structure to hold all components in place while permitting the piezoelectric transducer to generate pulses of the desired frequency, frequency bandwidth, and pulse width without undesired echoes and/or attenuations.

10 Claims, 24 Drawing Sheets

(56) References Cited

U.S. PATENT DOCUMENTS

| | | | | |
|---|---|---|---|---|
| 5,332,943 | A | 7/1994 | Bhardwaj | |
| 5,936,163 | A | 8/1999 | Greathouse | |
| 9,425,384 | B2 | 8/2016 | Lhuillier | |
| 9,618,481 | B2 | 4/2017 | Kruger | |
| 11,620,973 | B2 * | 4/2023 | Xiang | G10K 11/004 310/334 |

OTHER PUBLICATIONS

R. Kazys, A. Voleisis, R. Sliteris, B. Voleisiene, L. Mazeika, H. A. Abderrahim, "Research and development of radiation resistant ultrasonic sensors for quasi-image forming systems in a liquid lead-bismuth", Ultragarsas (Ultrasound), vol. 62, No. 3, 2007.

R. Kazys, A. Voleisis, B. Voleisiene, "High temperature ultrasonic transducers: review", Ultragarsas (Ultrasound), vol. 63, No. 2, 2008.

Neelesh Bhadwal, Mina Torabi Milani, Thomas Coyle and Anthony Sinclair, "Dry Coupling of Ultrasonic Transducer Components for High Temperature Applications", Sensors 2019, 19, 5383.

R. Kazys, R. Sliteris, A. Voleisis, B. Voleisiene, A. Abderrahim, and P. Kupschus, "Development of ultrasonic transducers for ranging and imaging in heavy liquid metal," Sensors, 2004 IEEE, Vienna, 2004, pp. 646-649 vol. 2.

Examiner's search strategy and results, U.S. Appl. No. 16/528,581, filed Apr. 25, 2022.

Examiner's search strategy and results, Search information including classification, databases and other search related notes, U.S. Appl. No. 16/528,581, filed May 10, 2022.

Examiner's search strategy and results, Search information including classification, databases and other search related notes, U.S. Appl. No. 16/528,581, filed Nov. 15, 2022.

Examiner's search strategy and results, Search information including classification, databases and other search related notes, U.S. Appl. No. 16/528,581, filed Feb. 10, 2023.

* cited by examiner

RADIATION AND HIGH-TEMPERATURE TOLERANT PIEZOELECTRIC ULTRASONIC CONTACT TRANSDUCER WITH MOUNTING ASSEMBLY

CROSS-REFERENCE TO RELATED APPLICATIONS

This application is a continuation-in-part of and claims the benefit of and priority to U.S. patent application Ser. No. 16/528,581 filed Jul. 31, 2019 and published as U.S. Patent Appl. Publ. No. US 2020/0143781 A1 on May 7, 2020, which claims the benefit of and priority to U.S. Provisional Patent Application Ser. No. 62/766,771 filed Nov. 5, 2018.

STATEMENT REGARDING FEDERALLY SPONSORED RESEARCH OR DEVELOPMENT

This invention was made with government support under ##DE-SC0020019 awarded by the U.S. Department of Energy. The government has certain rights in the invention.

FIELD OF INVENTION

The present disclosure concerns an ultrasonic transducer, which acts as emitter, receiver or transceiver of acoustic or ultrasonic waves that propagate in solids and fluids.

BACKGROUND

In the field of non-destructive testing (NDT), the ultrasound-based technique is widely used for the characterization of materials and components, such as identifying the defects in components, determining wall thickness in a corrosive environment, sensing proximity to mention a few uses.

Many industrial manufacturing processes involve the use of high temperature and pressure to facilitate chemical and physical reactions in the formation of materials, components, and structures. Some may also involve radioactive and corrosive environments. Some may even involve thermal cycling. These conditions are often encountered in the manufacturing of metal, ceramics, and plastics. They are also encountered in the processing of petroleum and the generation of energy in nuclear, fossil fuel, and hydroelectric power plants. It is highly desirable to be able to monitor the process parameters and structures used in such practices with ultrasonic technology. To do so it is necessary to have ultrasound transducers that can function properly in those respective hostile conditions.

One application related to ultrasound transducers is their use in high temperatures and radiation environments, such as the fast neutron reactors and spent nuclear fuel storage casks, for long term monitoring and sensing applications. Such ultrasonic transducers should be operating properly in high temperatures and in extreme radiation for a long operation life, for example, for several decades, as well as exhibit the ability to survive and properly operate after an initial cleaning process which usually involves corrosive chemicals or materials. These transducers must be able to operate as emitters and receivers of acoustic or ultrasonic waves over a wide range of frequencies, typically from a few megahertz to tens of megahertz.

Because of their generic features, these transducers can be modified for other fields of applications such as the instrumentation of pressurized-water reactors, non-nuclear high-temperatures, cryogenic instrumentations in industries, and harsh conditions generally encountered in petrochemical and chemical industries.

A persistent problem with high-temperature ultrasound transducer devices is the failure to maintain intimate contact between the piezoelectric element and the delay block to which it is installed. The adhesive/couplant available for making contact can deteriorate at high temperatures. Additionally, most adhesive/couplant compounds are made from organic epoxy and will fail in a radiation environment.

Thus, there is a need for an ultrasonic transducer that is suitable for high temperature and radiation affected operations.

SUMMARY

The problems and shortcomings of traditional ultrasonic transducer devices are overcome by the embodiments for a radiation and high-temperature tolerant piezoelectric ultrasonic contact transducer with a screw-in assembly.

The embodiments for a novel ultrasonic transducer assembly can include stainless steel and ceramic material parts, and since both materials are radiation-resistant they can make the embodiments for a transducer radiation-tolerant. The embodiments can feature a stainless-steel housing with a cylindrical opening in it. The housing can contain a stainless-steel backing. A piezoelectric element can be attached to the bottom of the backing and can be pushed out of the cylindrical opening using a pressure screw, making both electrical and mechanical contact with a delay line structure.

The embodiments, due to their design and material selections, offer superior tolerance to high temperatures, cryogenic temperature, corrosion, and high-level radiation. More specifically, the present embodiments support a piezoelectric element and maintain its operation necessary to effectively transmit and receive acoustic and ultrasonic waves of certain desirable characteristics into solid or fluid materials when the device is placed under harsh environments.

BRIEF DESCRIPTION OF THE DRAWINGS

The present embodiments are better understood by reference to the following detailed description when considered in connection with the accompanying drawing, wherein.

DETAILED DESCRIPTION

Figure 1:
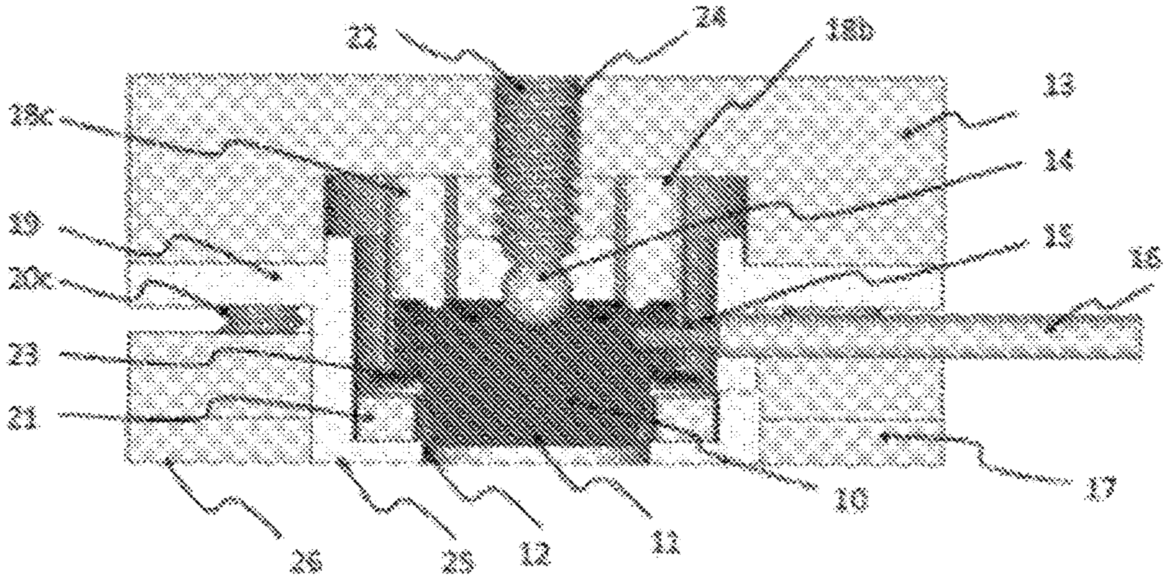
FIG. 1 is an external isometric view in reduced scale of the embodiment.
Figure 2:
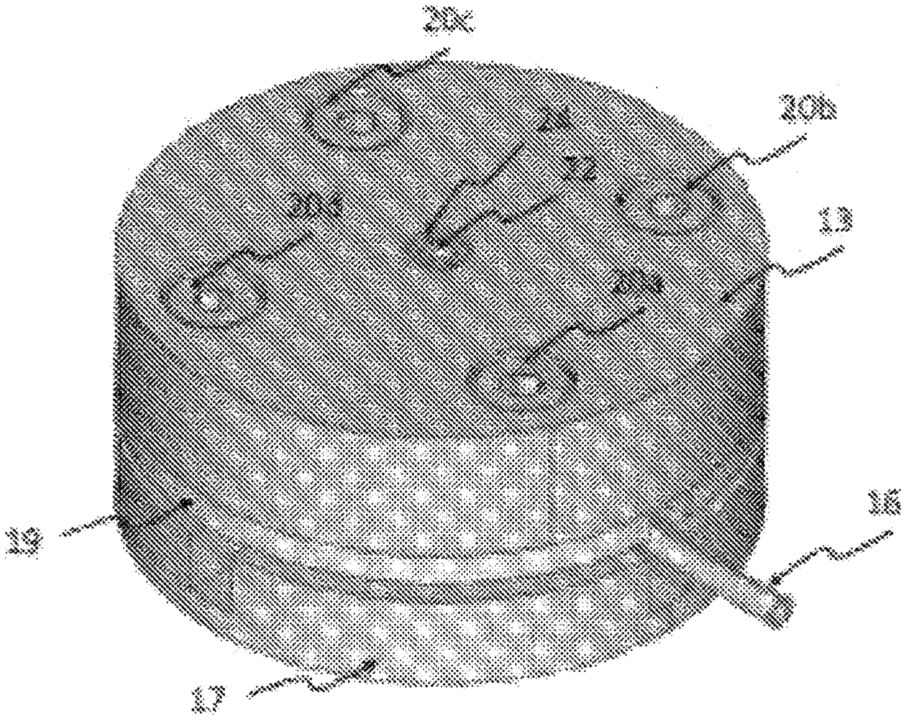
FIG. 2 is an external isometric view of the embodiment in reduced scale.
Figure 3:
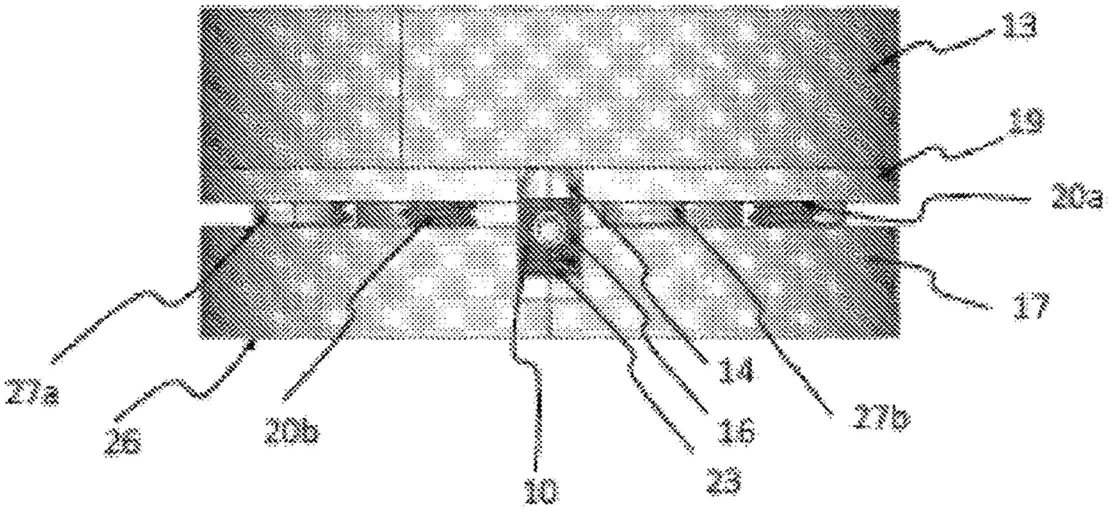
FIG. 3 is a side view with direction such that the radio frequency electrode is facing toward the reader.
Figure 4:
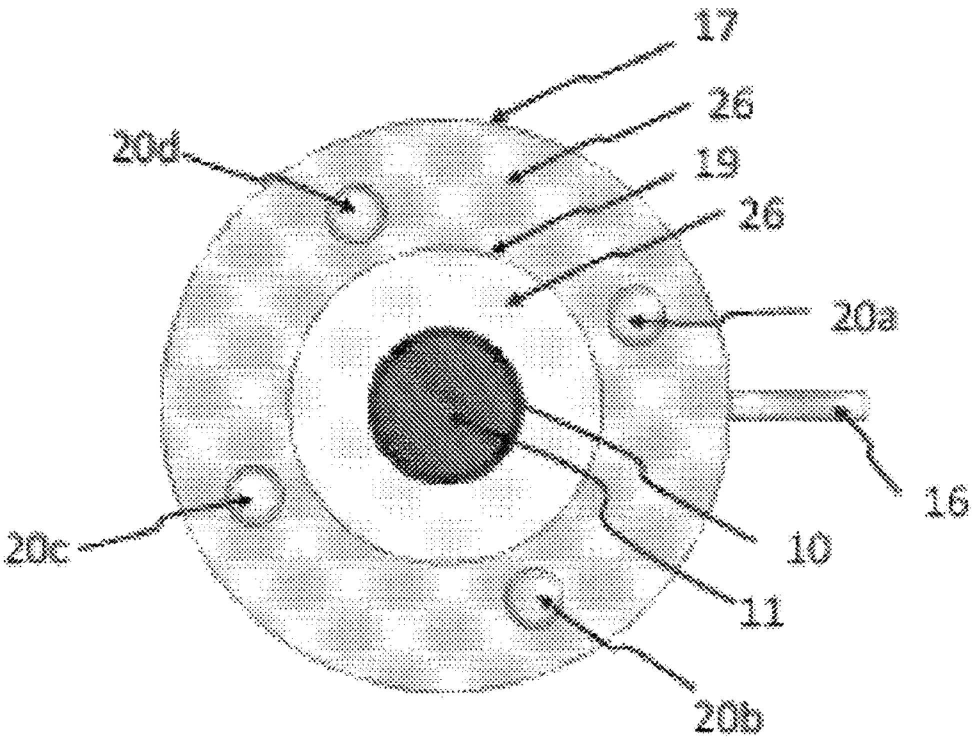
FIG. 4 is a bottom view of the embodiment.
Figure 5:
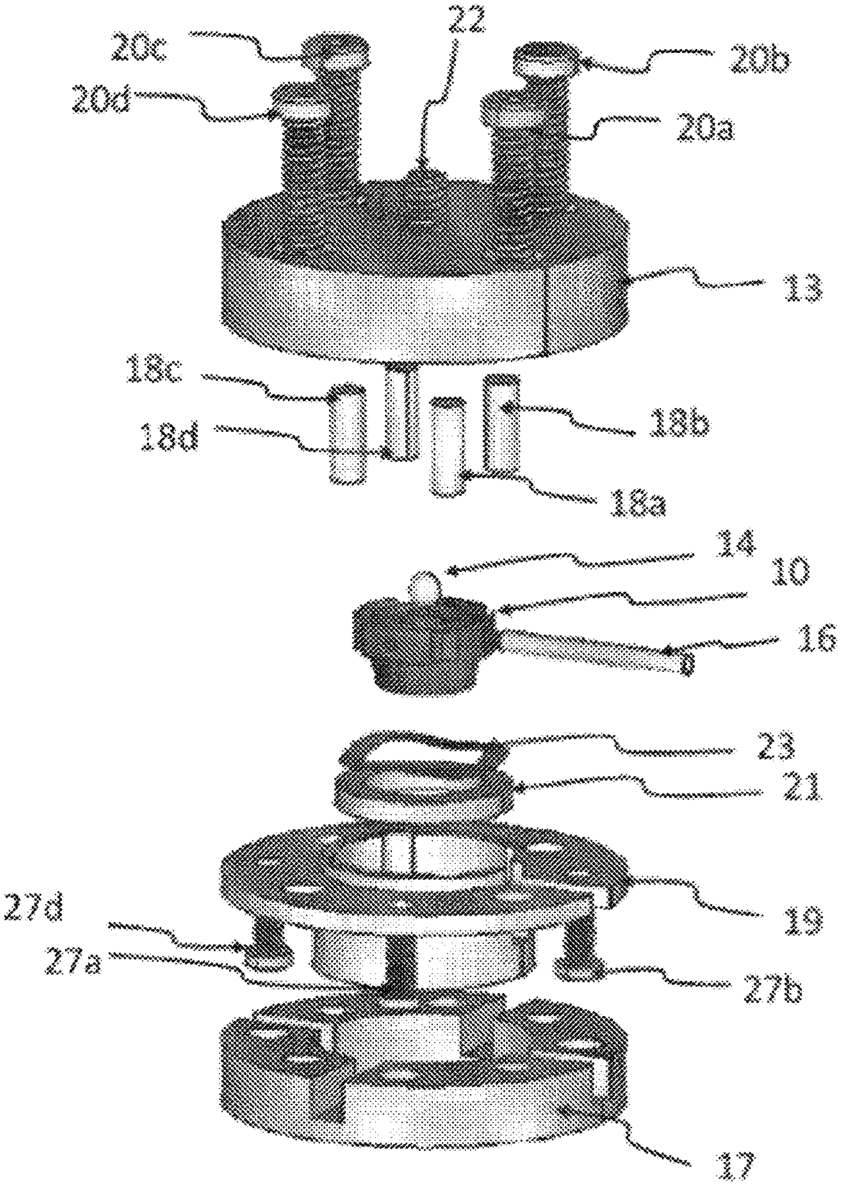
FIG. 5 is an exploded view of the embodiment.
Figure 6:
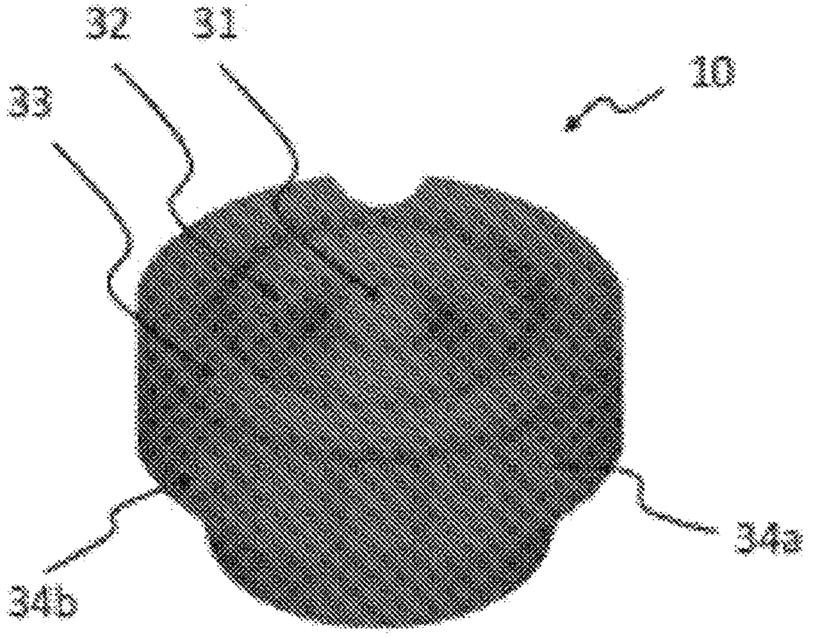
FIG. 6 is an isometric view of the backing for the embodiment shown in FIG. 1 and FIG. 5.
Figure 7:
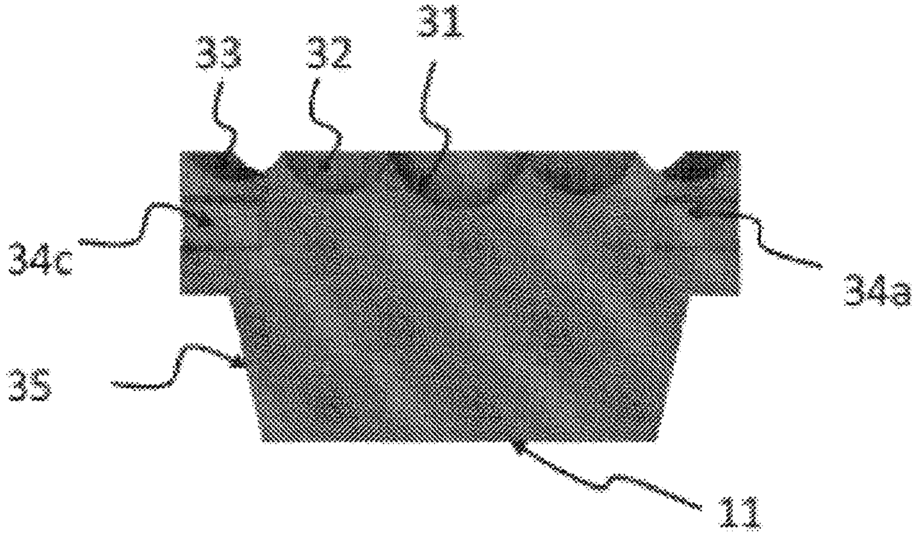
FIG. 7 is a section view of the backing for the embodiment shown in FIG. 1 and FIG. 5.
Figure 8:
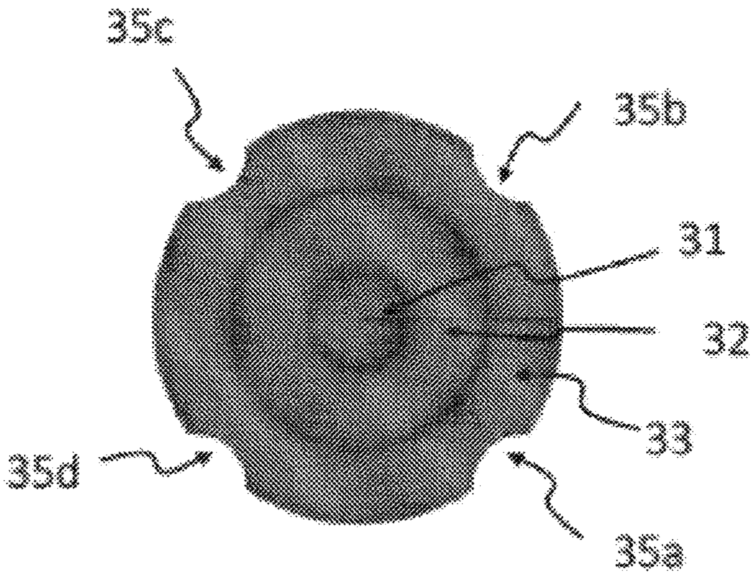
FIG. 8 is a top view of the backing for the embodiment shown in FIG. 1 and FIG. 5.
Figure 9:
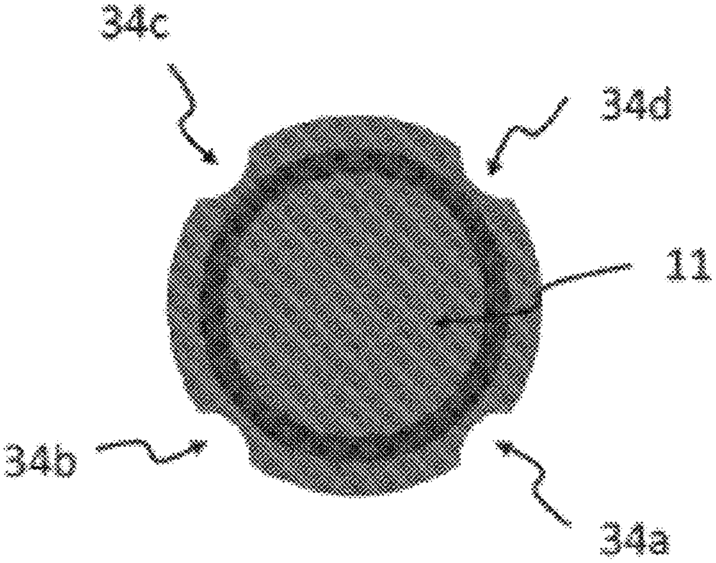
FIG. 9 is a bottom view of the backing for the embodiment shown in FIG. 1 and FIG. 5.
Figure 10:
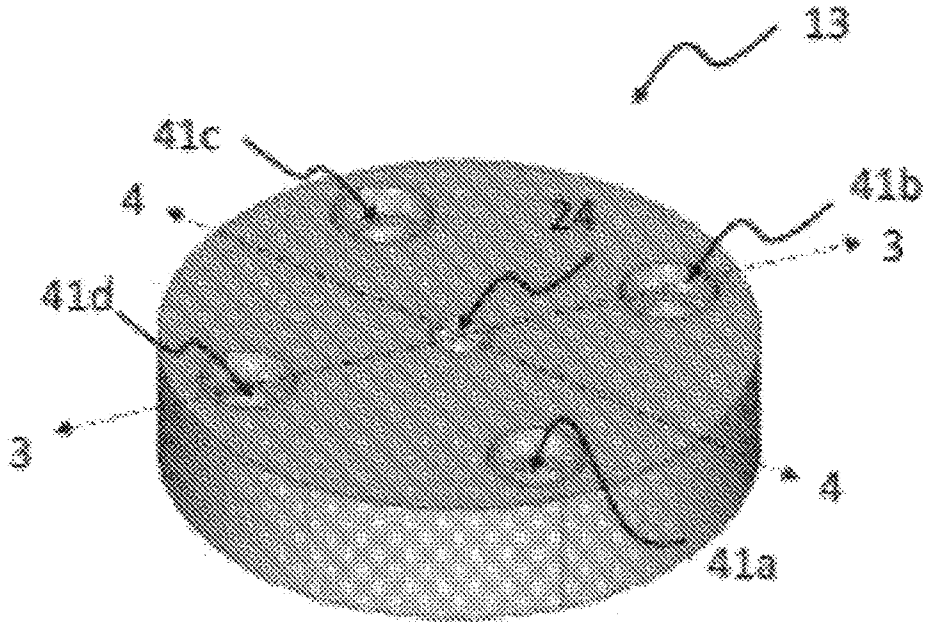
FIG. 10 is an isometric view of the top enclosure for the embodiment shown in FIGS. 1-3, and FIG. 5.
Figure 11:
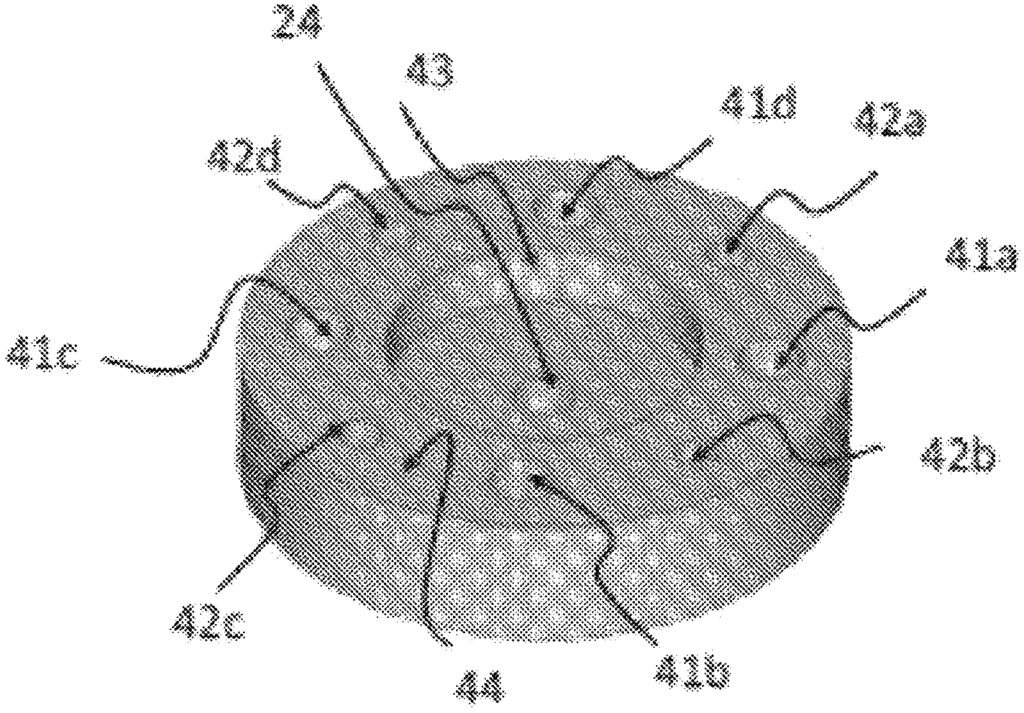
FIG. 11 is a bottom isometric view of the top enclosure for the embodiment shown in FIGS. 1-3 and FIG. 5.
Figure 12:
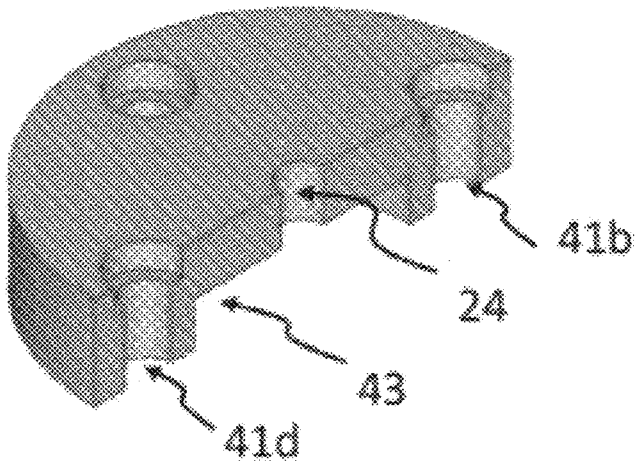
FIG. 12 a cross-sectional view of the top enclosure taken along line 3-3 of FIG. 10.
Figure 13:
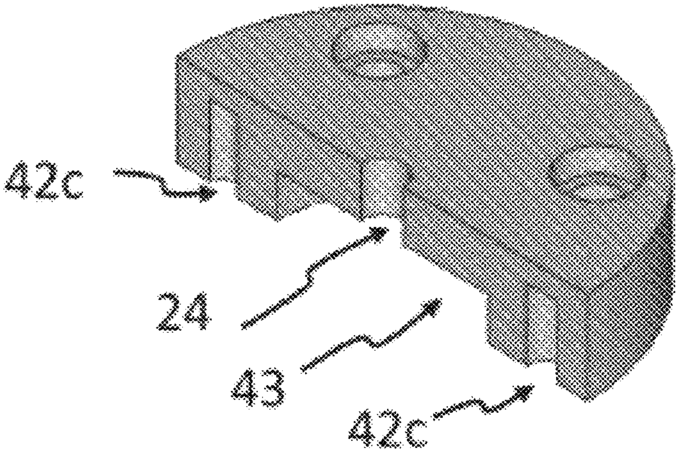
FIG. 13 a cross-sectional view of the top enclosure taken along line 4-4 of FIG. 10.
Figure 14:
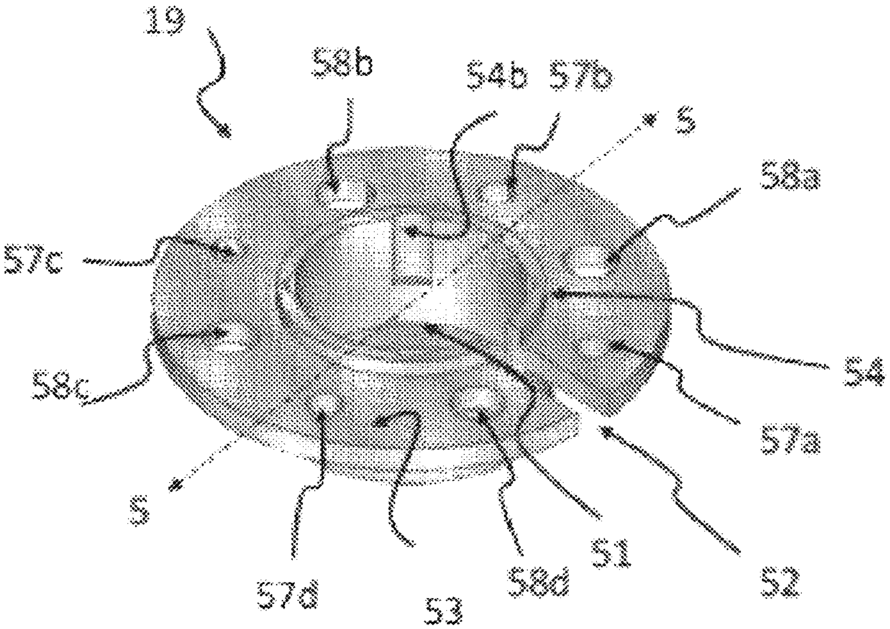
FIG. 14 is an isometric view of the bottom enclosure for the embodiment shown in FIGS. 1-5.
Figure 15:
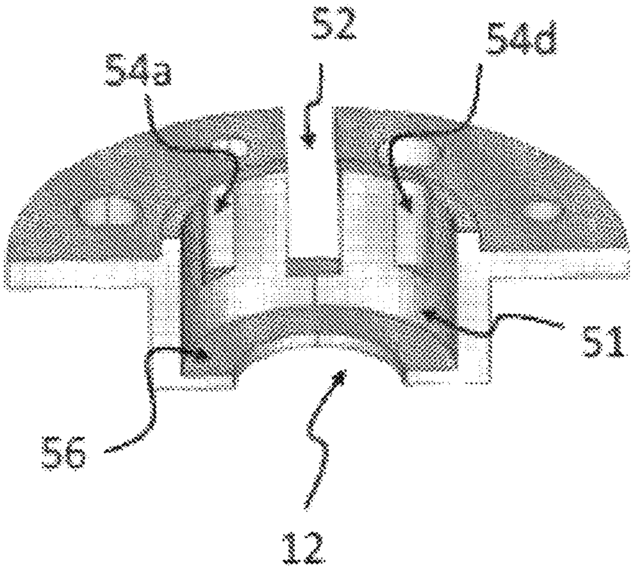
FIG. 15 a cross-sectional view of the bottom enclosure taken along line 5-5 of FIG. 10.
Figure 16:
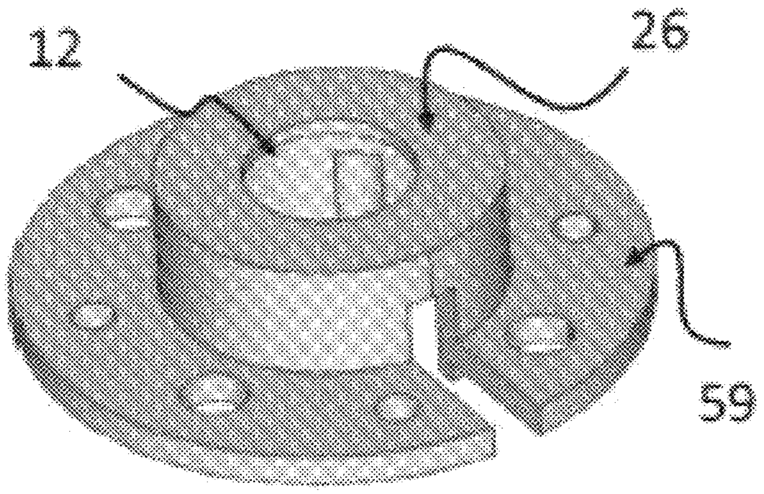
FIG. 16 is a bottom isometric view of the bottom enclosure for the embodiment shown in FIG. 1-5.
Figure 17:
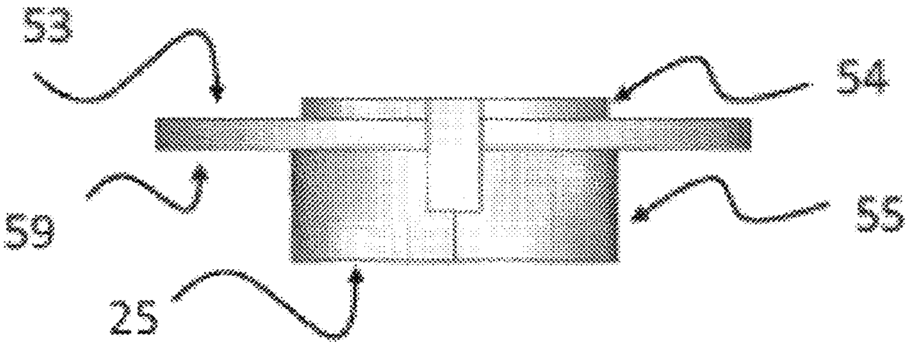
FIG. 17 is a side view of the bottom enclosure taken along line 4-4 of FIG. 10.

The terminology used herein is for the purpose of describing particular embodiments only and is not intended to be limiting of the invention. As used herein, the term "and/or" includes any and all combinations of one or more of the associated listed items. As used herein, the singular forms "a," "an," and "the" are intended to include the plural forms as well as the singular forms, unless the context clearly indicates otherwise. It will be further understood that the terms "comprises" and/or "comprising," when used in this specification, specify the presence of stated features, steps, operations, elements, and/or components, but do not preclude the presence or addition of one or more other features, steps, operations, elements, components, and/or groups thereof.

Unless otherwise defined, all terms (including technical and scientific terms) used herein have the same meaning as commonly understood by one having ordinary skill in the art to which this invention belongs. It will be further understood that terms, such as those defined in commonly used dictionaries, should be interpreted as having a meaning that is consistent with their meaning in the context of the relevant art and the present disclosure and will not be interpreted in an idealized or overly formal sense unless expressly so defined herein.

In describing the invention, it will be understood that a number of techniques and steps are disclosed. Each of these has individual benefit and each can also be used in conjunction with one or more, or in some cases all, of the other disclosed techniques. Accordingly, for the sake of clarity, this description will refrain from repeating every possible combination of the individual steps in an unnecessary fashion. Nevertheless, the specification and claims should be read with the understanding that such combinations are entirely within the scope of the invention and the claims. The present disclosure is to be considered as an exemplification of the invention and is not intended to limit the invention to the specific embodiments illustrated by the figures or description herein.

Various embodiments of the present invention may incorporate one or more of these and the other features described herein. The following detailed description taken in conjunction with the accompanying drawings may provide a better understanding of the nature and advantages of the present invention. It should be understood, however, that the following descriptions, while indicating preferred embodiments and numerous specific details thereof, are given by way of illustration and not of limitation. Many changes and modifications may be made within the scope of the embodiments herein without departing from the spirit thereof, and the embodiments herein include all such modifications.

While the invention has been described with a certain degree of particularity, it is manifest that many changes may be made in detail of construction and the arrangement of components without departing from the spirit and scope of this disclosure. The present disclosure is to be considered as an exemplification of the principles of the invention and is not intended to limit the invention to the specific embodiments illustrated herein by the figures or description above.

Referring now to FIGS. 1-5, an embodiment for an ultrasonic transducer is illustrated. The embodiments may be employed to systems to monitor internal conditions inside a nuclear waste cask or nuclear reactor, in such an application the materials choice in the realization of present embodiments is important. For the high temperature and radiation applications, the embodiments for a transducer have a stainless steel (e.g., 304) backing 10. A piezoelectric element (not shown) may be mounted on the front face 11 of the backing 10. The piezoelectric element can be LiNbO3, quartz, AlN, ZnO or any other piezoelectric material suitable for its application environment. The preferred geometry of the piezoelectric element is a circular shape disc but square, rectangular, or any other disc shapes are also acceptable if they function with the embodiments. The piezoelectric element top and bottom surfaces can be coated with Cr/Au thin film. The Cr/Au thin film acts as high temperature mechanical couplant for efficient transfer of sonic energy from the piezoelectric element to the work structure. The piezoelectric element is mounted on the backing 10 with silver paint. The backing 10 is encapsulated by two enclosures made of stainless steel (e.g., 316). The top enclosure marked by numeral 13 and bottom enclosure is marked by numeral 19. The backing 10 is electrically isolated from the enclosure 13 and 19 with the use of a ceramic washer 21, a ceramic ball 14 and a set of four ceramic rods 18 *a-d*. The electrical connection to the backing is established by a stainless steel (e.g., 304) threaded RF connection rod 15 and an internally threaded stainless steel (e.g., 304) tube 16. The rod 15 and tube 16 are electrically connected to the backing but are electrically isolated from the enclosure. Two enclosures 13 and 19 are joined together using four stainless (e.g., 316) enclosure screws 27 *a-d* (visible in FIG. 3) with components, backing 10, four ceramic rods 18 *a-c*, ceramic washer 21, ceramic ball 14, carbon steel spring washer 23 and RF connection rod 15 properly assembled.

Still referring to FIGS. 1-5, the top enclosure has a threaded through hole 24, through which a set screw 22 is inserted to make a contact with the ceramic ball 14. When set screw 22 is tightened, the backing 10 (with the piezoelectric element mounted on surface 11 when fully implemented) is pushed out through the opening 12 in the bottom enclosure, thus the piezoelectric element makes contact with the work structure (not visible here). On further establishing the electrical contact the setscrew 22 is used to apply force on the piezoelectric element. A carbon steel spring 23 retracts the backing inside the first and second enclosures 13, 19, when the transducer is either not mounted on the work structure or during transportation, to prevent damages to the piezoelectric element.

Now referring to FIGS. 6-9, the detail view of the backing 10 used in embodiment shown in FIGS. 1-5 is illustrated. The backing material is made of metal, preferably stainless steel 304, and is circular in shape. The bottom surface 11 is a flat surface for mounting piezoelectric elements. The top surface has a hemisphere 31 in the center and two hemispherical slots 32 and 33 around the hemisphere 31. The radius of the hemispheres 31, 32 and 33, is a variant of the embodiments and based on the operation frequency of the transducer. The slot radius for hemisphere 32 is three times the radius of hemisphere 31 and slot radius for hemisphere 33 is five times the radius of hemisphere 31. According to an embodiment, the radius of the three hemispheres is given offsets as 3 λ/4 for slot 32 and 5 λ/4 for slot 33, where λ is the wavelength of acoustic wave in the backing. The ceramic ball 14 (referring to FIG. 1) is a same radius as of the hemisphere 31.

Still referring to FIGS. 6-9, the backing has four thread holes 34*a-d*, for radio frequency (RF) connection rod 15 and tube 16. According to some embodiments, the maximum depth for holes 34*a-d* is limited to three times the radius of hemisphere 31. The surface 35 is inclined with respect to vertical. According to an embodiment, the inclination is variable from 0 degree to 45 degrees. The backing 10 has four alignment slots 35*a-d* and their curvature radius is same as the ceramic rods 18*a-d* (referring to FIG. 5). The purpose of the slots 35*a-d* is to keep the backing aligned when it is moved in and out of the enclosure and also to prevent rotation of backing when the pressure screw (referring to FIG. 5) is turned to increase the pressure on the piezoelectric element.

Now referring to FIGS. 10-13, a detail view of the top enclosure 13 used in embodiment shown in FIGS. 1-5 is illustrated. The purpose of this unit is to provide the enclosure as well as the mechanical support to apply a high pressure to the piezoelectric element via pressure screw 22. The top enclosure 13 is a disc shape structure with a tapped through hole 22 for the pressure screw 22. The through holes 41 *a-d* are for mounting screws 20 *a-d*. The through holes 41 *a-d* also have a screw head clearance (visible in FIG. 12) to minimize the overall thickness of the transducer.

In the embodiments, a bottom surface 44 of the top enclosure 13 has blind tapped holes 42*a-d* to join top enclosure 13 and bottom enclosure 19 with a set of four enclosure screws 27*a-d*. During joining, the bottom surface 44 is in direct contact with the bottom enclosure. The top enclosure 13 also has a clearance for the backing 10 and a ceramic ball 14 to retract inside the enclosure.

Now referring to FIGS. 14-17, the detailed view of the bottom enclosure 13 used in the embodiment shown in FIG. 1-5 is illustrated. The bottom enclosure 14 has a shape like a circular disc with a clearance 51 for all essential components of the transducer. In the clearance 51, a ceramic washer 21, disc spring 23, backing 10, ceramic ball 14 are housed in a respective order. It has four guiding slots 54 *a-d* with slot radius same as the slots 35 *a-d* in backing 10. The ceramic rods 18 *a-d* fit between slots 54 *a-d* and slots 35 *a-d* to prevent rotation of backing and help guiding when the backing is drawn out of the opening 12 in the bottom of the bottom enclosure. The slot 52 provides a clearance for the rods 15 and tubes 16.

In the exemplary transducer assembly the surface 53 is in intimate contact with surface 44 of the top enclosure 13. The two units are fastened using four bolts 27 *a-d*. The four through holes 57 *a-d* are for four bolts 27 *a-d* and four through holes 58 *a-d* are clearance holes for four bolts 20 *a-d*. For proper coaxial alignment of the bottom enclosure 19 has alignment ring 54. The outer radius of the alignment ring is same as the internal radius for the clearance hole 43 in the top enclosure 13. On installation of the transducer, the surface 25 of the bottom enclosure is in both mechanical and electrical contact with the work structure. The cylindrical surface 51 is the alignment surface allowing the transducer to be aligned in the mounting ring 17.

Figure 18:
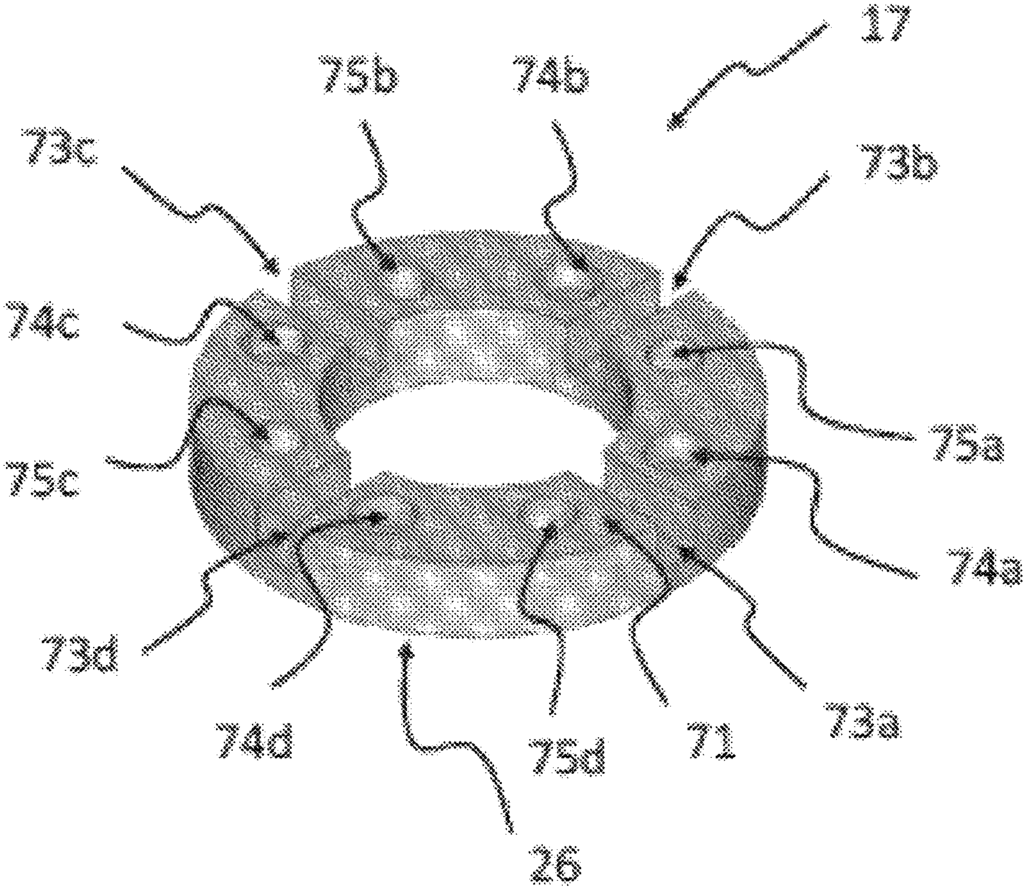
FIG. 18 is an isometric view of the mounting ring for the embodiment shown in FIG. 1-5.

Now referring to FIG. 18, the detail view of the mounting ring 17 used in embodiment shown in FIGS. 1-5 is illustrated. The mounting ring provides the mechanical base for the mounting of the transducer. The bottom surface 26 of the mounting ring is needed to be welded to the work structure. The mounting of the transducer requires threaded holes for four mounting bolts 20 *c-d*. The mounting provides the four precision threaded holes 75 *a-d* on the top surface 71 of the mounting ring when precision machining on work structure is not possible. The top surface 71 also has four blind clearance holes 74 *a-d* for the heads of four bolts 27 *a-d*. The four clearance slots 73 *a-d* are used to provide clearance to the rod 15 and tube 16 for RF connections to the backing 10. The four clearance slots 73 *a-d* allows the easy mounting of the transducer with RE connection extending in any of the four directions.

The embodiments provide an improved transducer for transmitting and sonic energy for use in high temperature, high pressure and in radiation environment. The superior benefits of the transducer herein described are central loading to provide uniform contact pressure between work structure and the piezoelectric element. Furthermore, the material choice and maintenance of the contact pressure are necessary for quality operation at all temperatures. Apart from high temperature performance, the choice of material and design also ensure the long term operation in radiation environment.

Alternative embodiments to the transducer assembly can include a hard-faced contact ultrasonic transducer device suitable for transmitting ultrasound pulses into a structure under inspection at a temperature substantially above or below room temperature and other harsh conditions, such as extreme radiation present in nuclear fuel storage cask and nuclear reactors. The embodiments can comprise a stainless-steel backing with multiple spherical surfaces and a conical surface on the back surface designed to disperse the acoustic waves entering the backing and minimize the echo signal from the backing back surface. An exemplary piezoelectric transducer can be bonded on the front face of the backing using conductive paint containing no organic materials, such as but not limited to, silver paint, gold paint, etc. An exemplary ultrasonic transducer housing can be a threaded design and can be mechanically mounted on the work structure like a nut and bolt configuration. The free face of the piezoelectric material can contact the structure under inspection into which an acoustic pulse can be launched. A pressure screw connected to the body of the transducer can force the backing against the structure under inspection to maintain high pressure required for the operation of the piezoelectric element at all conditions of operation. Thus, the piezoelectric element can be mechanically held between the structure under inspection and metallic backing, under high pressure and maintaining electrical connections at all conditions of operation.

Figure 19:
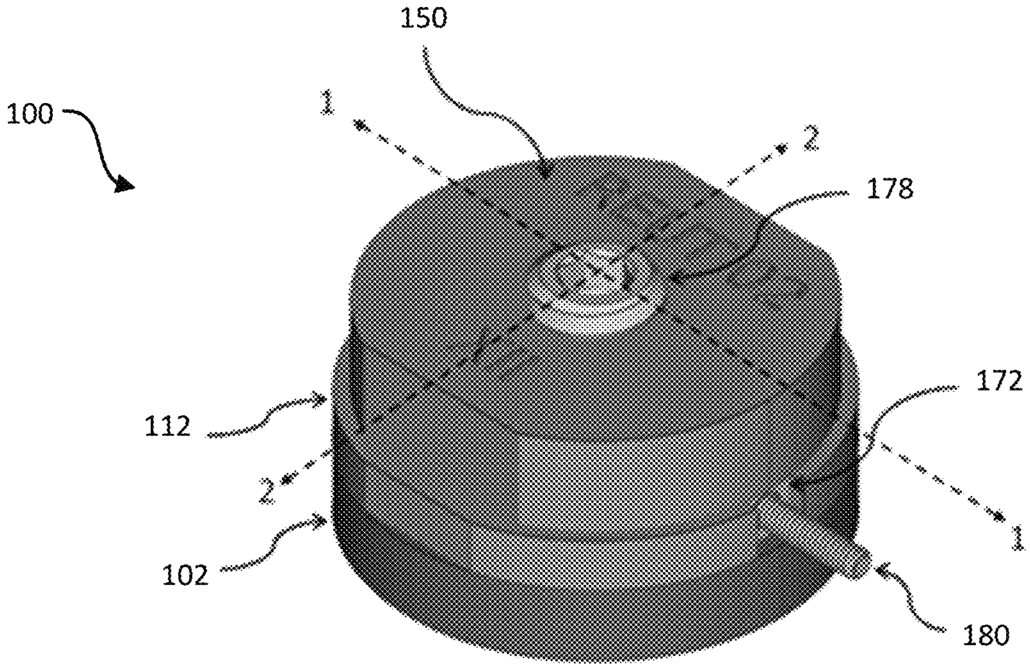
FIG. 19 is an external isometric view of an alternative embodiment for a piezoelectric transducer according to the embodiments.
Figure 20:
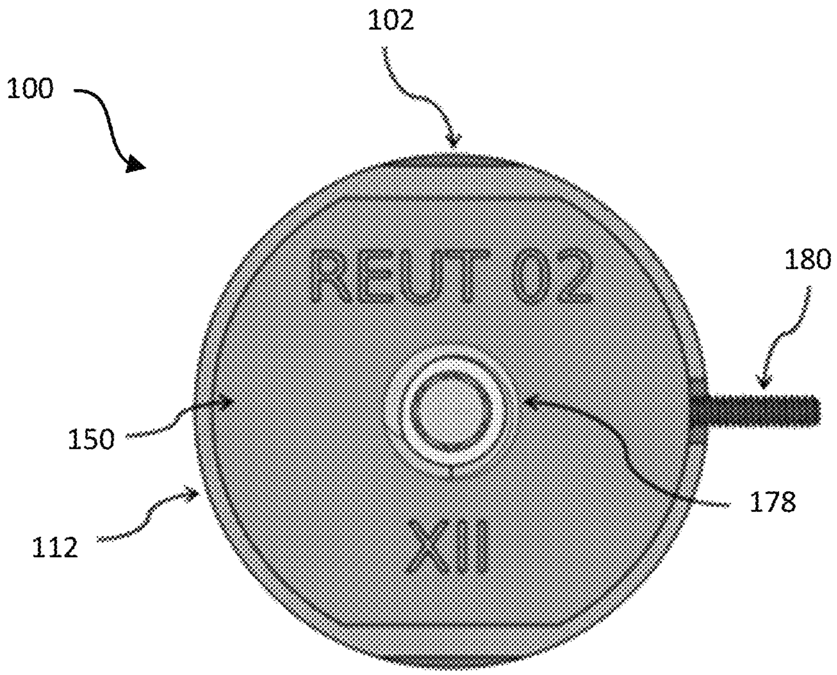
FIG. 20 is a top-end view of the embodiment for a piezoelectric transducer of FIG. 19.
Figure 21:
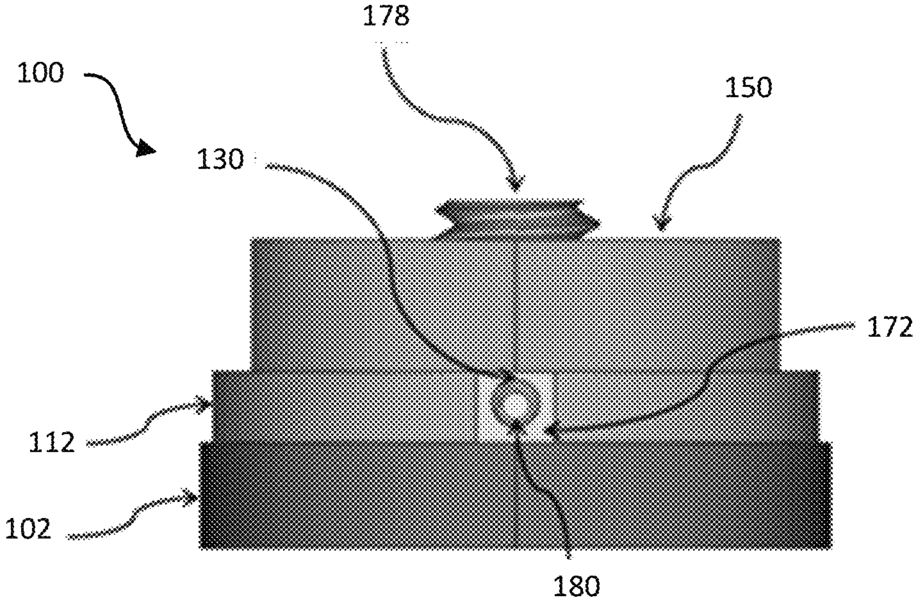
FIG. 21 is a side view of the embodiment of the piezoelectric transducer shown in FIG. 19, oriented such that a radio frequency (RF) connection rod, also referred to as the signal input and output port, is in a direct frontal view.

FIG. 19 is an external isometric view of an embodiment for a piezoelectric transducer 100. The transducer 100 can include a mounting ring 102, a bottom enclosure 112, a top enclosure 150, a set screw 178, and an RF connection rod 180. FIG. 20 is a top-end view of the embodiment for the piezoelectric transducer 100. FIG. 20 illustrates the top view of the mounting ring 102, bottom enclosure 112, top enclosure 150, set screw 178, and RF connection rod 180. FIG. 21 is a side view of the embodiment for the piezoelectric transducer 100, which includes the mounting ring 102, bottom enclosure 112, top enclosure 150, set screw 178 a ceramic spacer 172, a backing 102, and RF connection rod 180. The transducer 100 is oriented such that the RF connection rod 180, which is also referred to as a signal input and output port, is in a direct frontal view. The backing 102 may be made of metal such as stainless steel that is resistant to harsh environments such as those in high temperatures or radiation, or may be made of other materials that would function according to the embodiments. The transducer 100 device of the embodiments that is a contact type transducer design can be configurable to provide a broad-band ultrasound pulse with a center frequency from 1 MHz to 33 MHz simply by changing the piezoelectric element.

Figure 22:
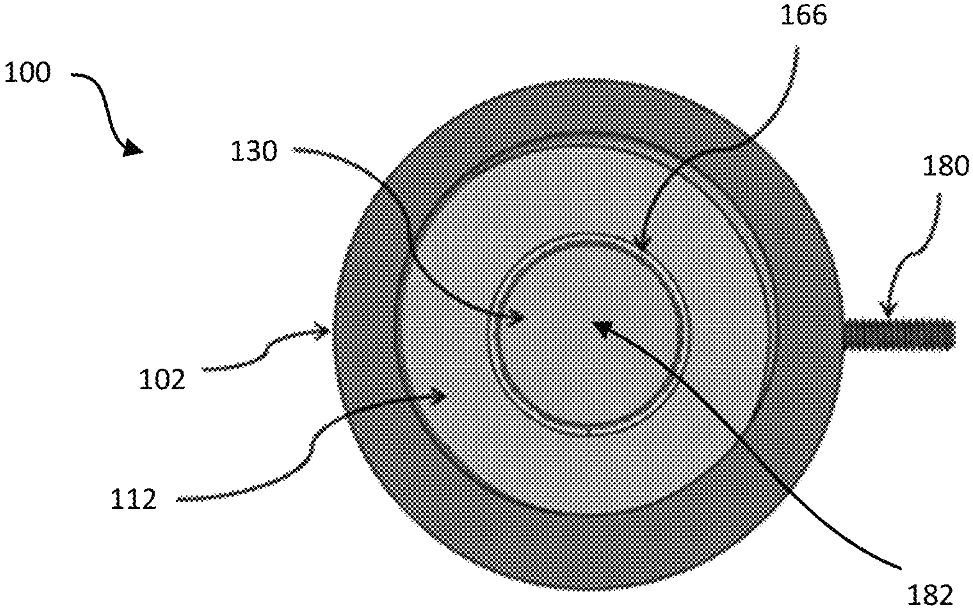
FIG. 22 is a bottom-end view of the embodiment for a piezoelectric transducer of FIG. 19.
Figure 23:
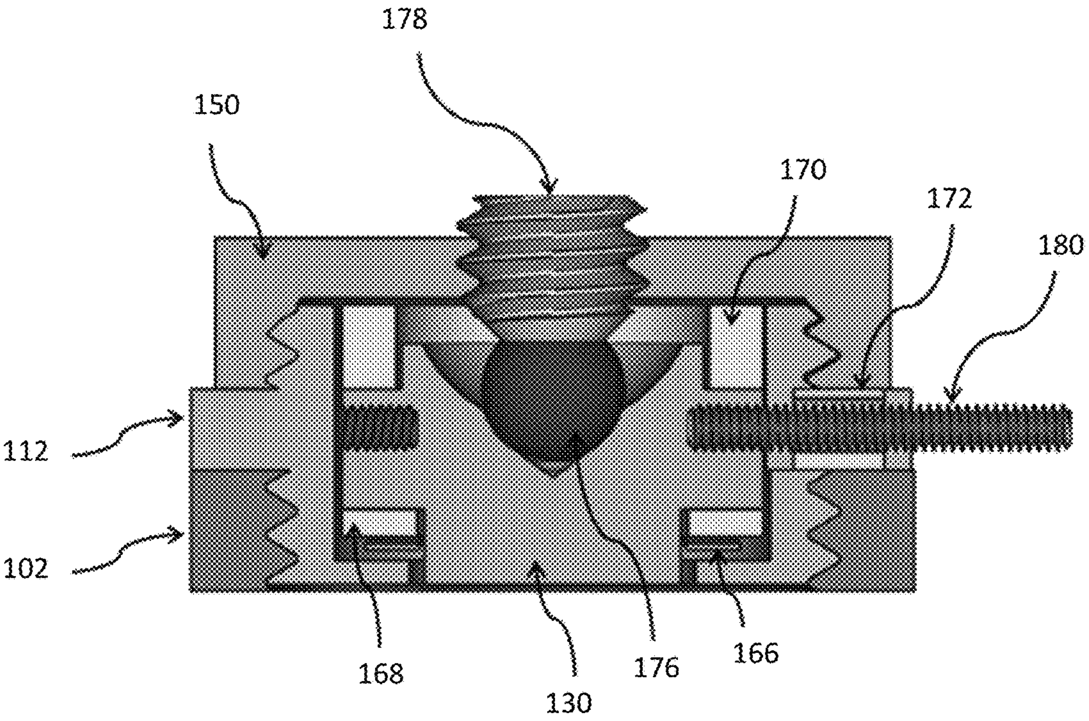
FIG. 23 is a section view of the embodiment for a piezoelectric transducer taken along line 1-1 of FIG. 19.
Figure 24:
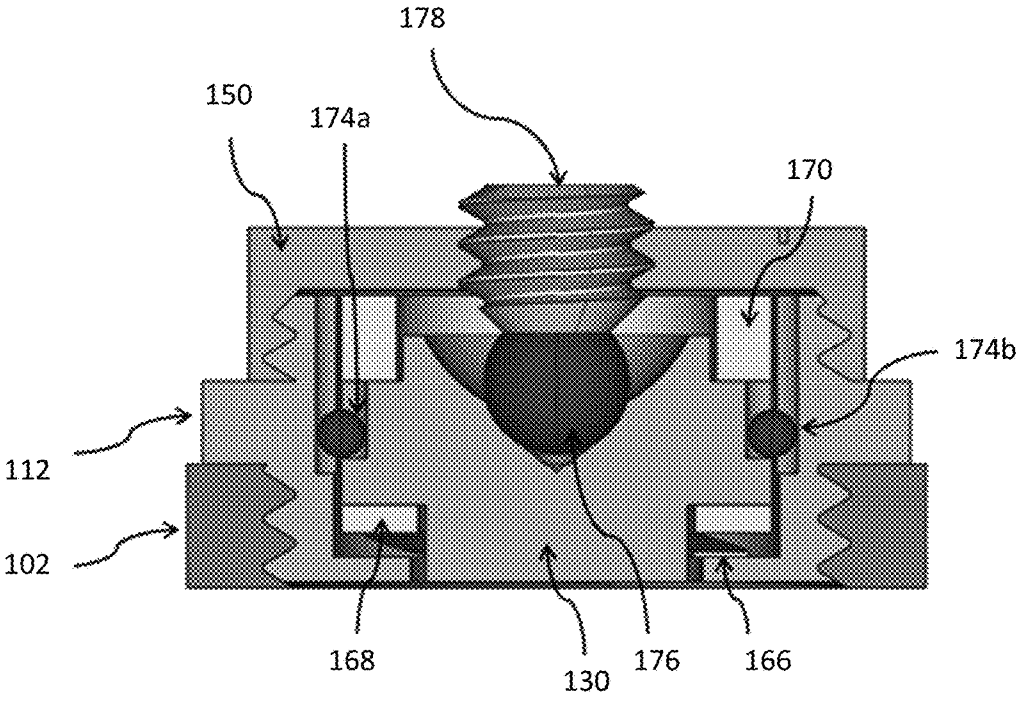
FIG. 24 is a section view of the embodiment for a piezoelectric transducer taken along line 2-2 of FIG. 19.

FIG. 22 is a bottom-end view of the embodiment for the piezoelectric transducer 100. The transducer 100 can include the mounting ring 28, the bottom enclosure 112, the backing 102, a spring washer 166, the RF connection rod 180, and a front face 182 or surface of the backing 102. FIG. 23 is a section view of the embodiment for the piezoelectric transducer 100 taken along line 1-1 of FIG. 19. The transducer 100 can include mounting ring 102, bottom enclosure 112, backing 130, top enclosure 150, spring washer 166, a first ceramic washer 168, a second ceramic washer 170, the ceramic spacer 172, a ceramic ball 176, a set screw 178, and RF connection rod 180. FIG. 24 is a section view of the embodiment for piezoelectric transducer 100 taken along line 2-2 of FIG. 19. The transducer 100 includes mounting ring 102, bottom enclosure 112, backing 130, top enclosure 150, spring washer 166, the first ceramic washer 168, the second ceramic washer 170, a first ceramic support ball 174 *a*, a second ceramic support ball 174 *b*, ceramic ball 176, and set screw 178.

Figure 25:
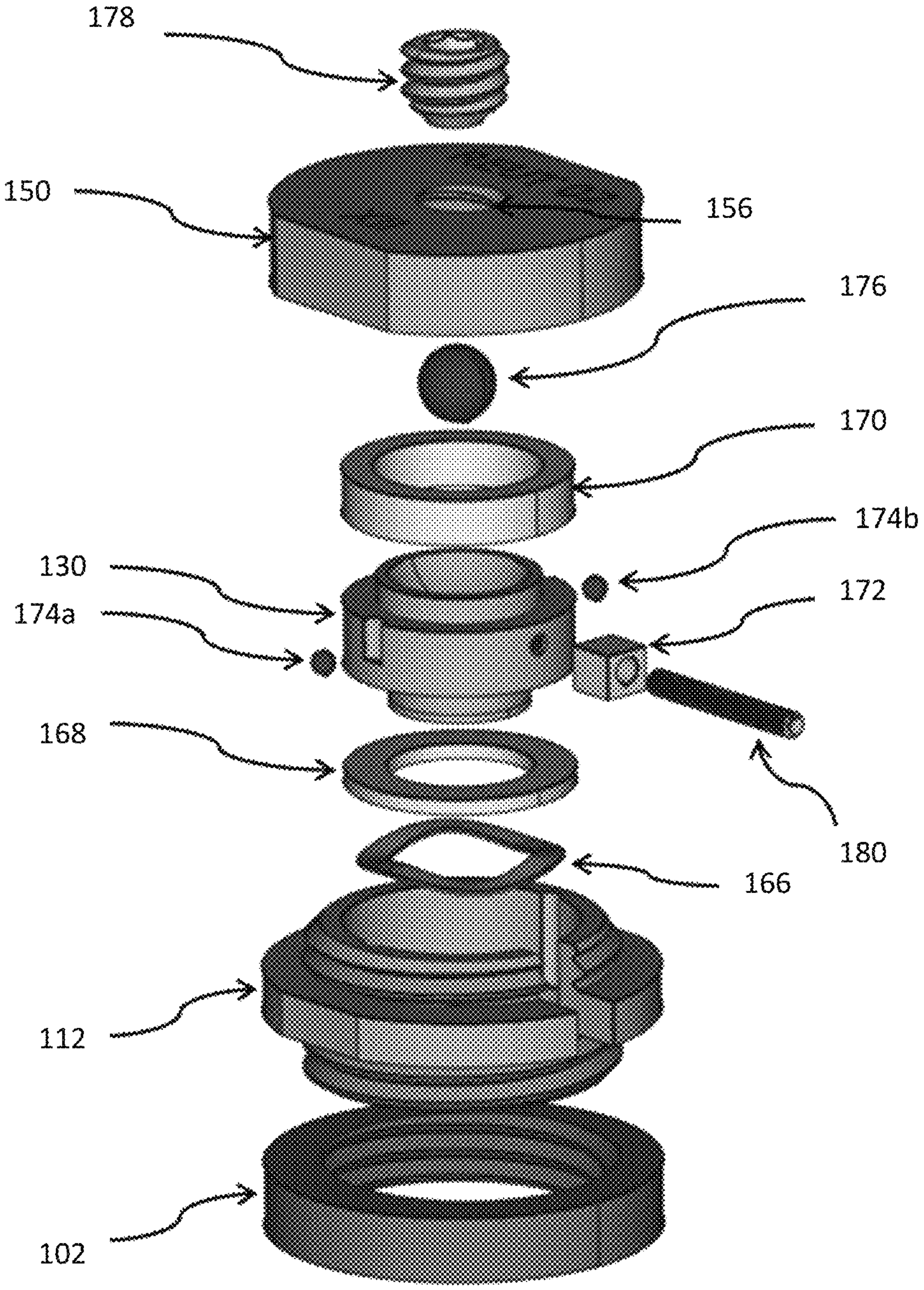
FIG. 25 is an exploded view of the embodiment for a piezoelectric transducer illustrated in FIG. 19.

FIG. 25 is an exploded view of the embodiment for piezoelectric transducer 100. The transducer 100 can include an assembly of mounting ring 102 that can connect to bottom enclosure 112 the first ceramic washer 168 and the spring washer 166 that seat between backing 130 and bottom enclosure 112, the top enclosure 150 that can house the second ceramic washer 170, the ceramic ball 176, and the backing 130. Top enclosure 150 can include a hole 156 through which the set screw 178 can be inserted to make contact with the ceramic ball 176. The backing 130 can include slotted portions 136*a*, 136*b* that can receive the first ceramic support ball 174*a* on one side of a circular outer wall of backing 130 and the second ceramic support ball 174*b* on an opposite side of the circular outer wall of the backing 130, respectively. The backing 130 can also receive one or more RF connection rods 180 that can be inserted into one or more of the thread holes 134*a*, 134*b* through ceramic spacer 172.

Referring now to the drawings in FIGS. 19-25, the embodiments may be employed to systems that have harsh environments such as high radiation levels. For example, the embodiments can monitor internal conditions inside a nuclear waste cask or a nuclear reactor. In such an application, the choice of the material in the realization of the embodiments for a transducer 100 is important. For the high temperature and radiation applications, the exemplary transducer 100 can include the backing 130. The materials preferred for the backing 130 include but are not limited to, stainless steel (e.g., 304/316), titanium, aluminum or any other metal or alloy suitable for the application environment. A non-metallic material may be used for backing 130 if the material can withstand the harsh environment and function according to the described embodiments herein.

A piezoelectric element (not shown) may be mounted on the front face 182 of the backing 130. The piezoelectric element can be manufactured from, but is limited to, LiNbO3, quartz, AN, ZnO, langasite or any other piezoelectric material suitable for the application environment. The geometry of a piezoelectric element can include, but is not limited to, a circular shape disc. However, other shapes of piezoelectric elements may be used such as square and rectangular disc shapes that can mount to the front face 182 and can function according to the embodiments. Piezoelectric element top and bottom surfaces may be coated with Cr/Au thin film, which acts as a high-temperature mechanical couplant for efficient transfer of acoustic energy from the piezoelectric element to the work structure. The piezoelectric element can be mounted on the front face 182 of the backing 130 with silver paint or any other conductive paste containing no organic materials. The backing 130 can be encapsulated by two enclosures made of high-grade metal, such as stainless steel (e.g., 304/316). The top enclosure 150 and the bottom enclosure 112 can house the internal elements of the transducer 100. The backing 130 can be electrically isolated from the top enclosure 150 and bottom enclosure 112 with the use of the first ceramic washer 168 and the second ceramic washer 170, ceramic spacer 172, and the set of ceramic support balls, the first ceramic support ball 174*a* and the second ceramic support ball 174*b*. The electrical connection to the backing 130 can be established by threaded RF connection rod 180. The RF connection rod 180 can be made of high-grade metal, such as stainless steel (e.g., 304/316), or other material that will function according the embodiments. The RF connection rod 180 can be electrically connected to the backing 130 but is electrically isolated from the top enclosure 150 and the bottom enclosure 112. The top enclosure 150 and the bottom enclosure 112 can be joined together using a threaded assembly with encapsulating components, backing 130, the first and second ceramic support balls 174*a* and 174*b*, the first ceramic washer 168 and second ceramic washer 170, ceramic ball 176, carbon steel spring washer 166, set screw 178, and RF connection rod 180, all properly assembled.

Still referring to FIGS. 19-25, the top enclosure 150 has threaded through hole 156, through which set screw 178 can be inserted to make a contact with the ceramic ball 176. When set screw 178 is tightened, the backing 130 with a piezoelectric element (not shown) mounted on front face or surface 182 can be pushed out through the opening 126 (see FIGS. 38-43) in the bottom enclosure 112, thus causing the piezoelectric element to make contact with a structure under inspection (not shown). On further establishing the electrical contact, the set screw 178 can be used to apply necessary stress on the piezoelectric element required for the operation of the transducer 100. The carbon steel spring washer 166 can retract the backing 130 inside the bottom enclosure 112 when the transducer 100 is either not mounted on the structure under inspection or during transportation to prevent damages to a piezoelectric element mounted on front face 182.

Referring to FIGS. 19-25, the transducer 100 can be mounted on a work structure using the mounting ring 102. The mounting ring 102 can be made of stainless steel (e.g., 316) or any metal or material that will function according to the embodiments. The mounting ring 102 can be welded or otherwise secured in direct contact with a structure under inspection, and the transducer 100 can then be mounted onto the mounting ring 102 using a threaded assembly or an equivalent functional assembly design. In an embodiment, the male mating thread on the bottom enclosure 112 can screw into the female mounting ring threads 104 (see FIG. 43) internal to the mounting ring 102. For mounting, the bottom end surface 128 of the circumferential ring (see FIG. 39) around the bottom enclosure 112 may be in contact with a structure under inspection.

Figure 26:
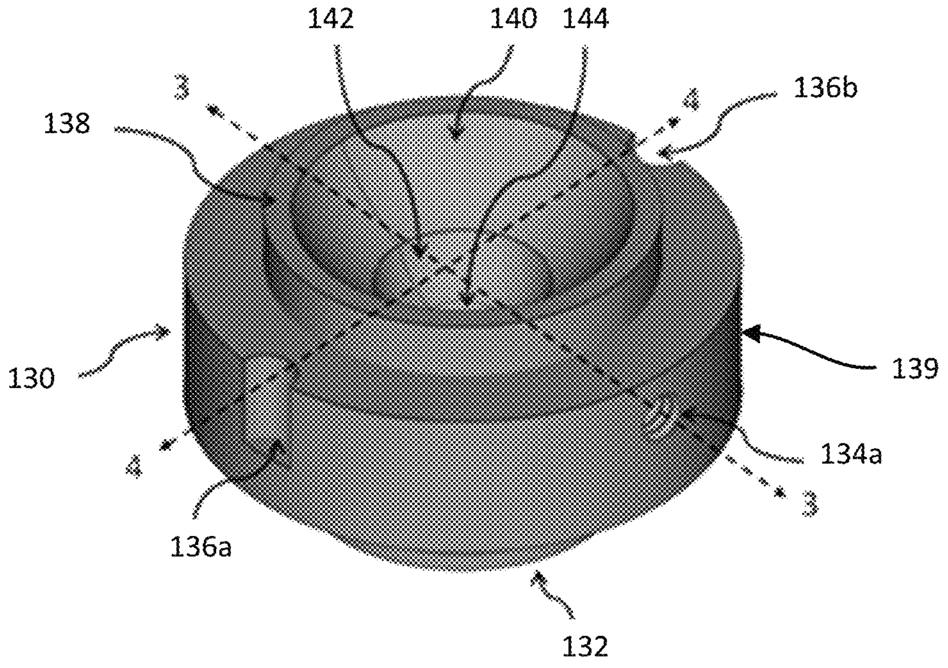
FIG. 26 is an isometric view of a backing for the embodiment for a piezoelectric transducer illustrated in FIGS. 23-25.
Figure 27:
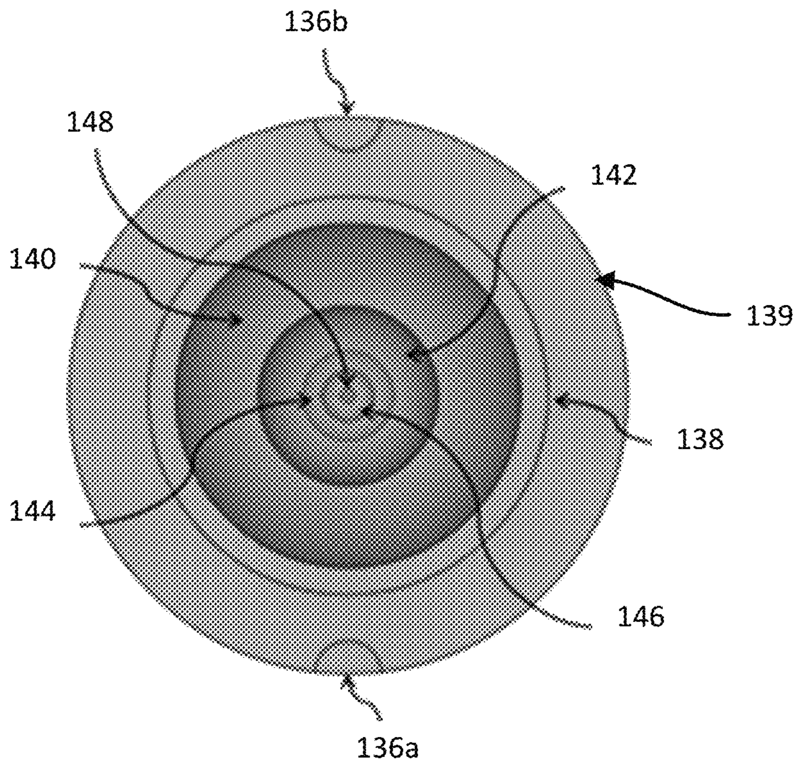
FIG. 27 is a top view of the backing for the embodiment for a piezoelectric transducer illustrated in FIGS. 23-25.
Figure 28:
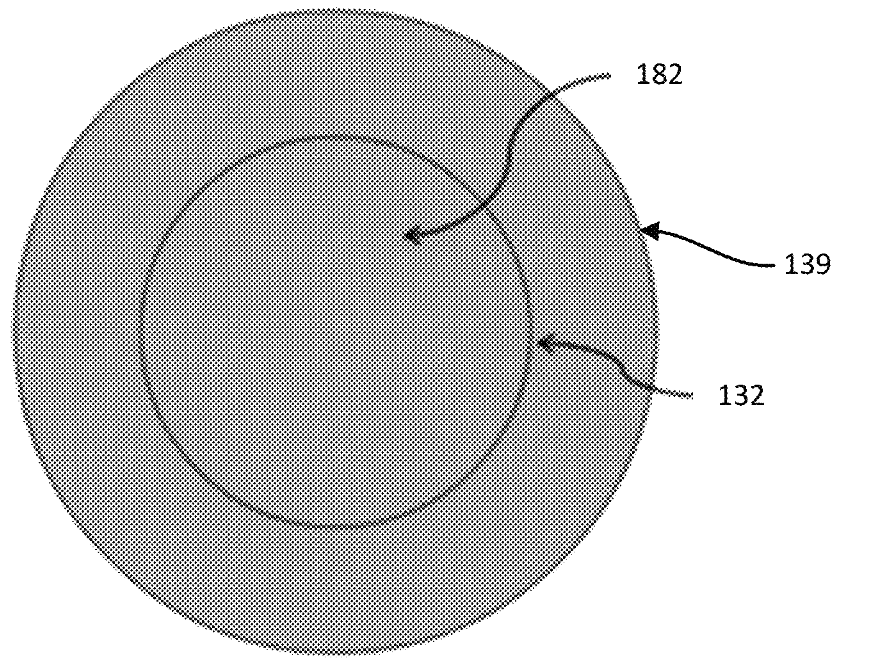
FIG. 28 is a bottom view of the backing for the embodiment for a piezoelectric transducer illustrated in FIGS. 23-25.
Figure 29:
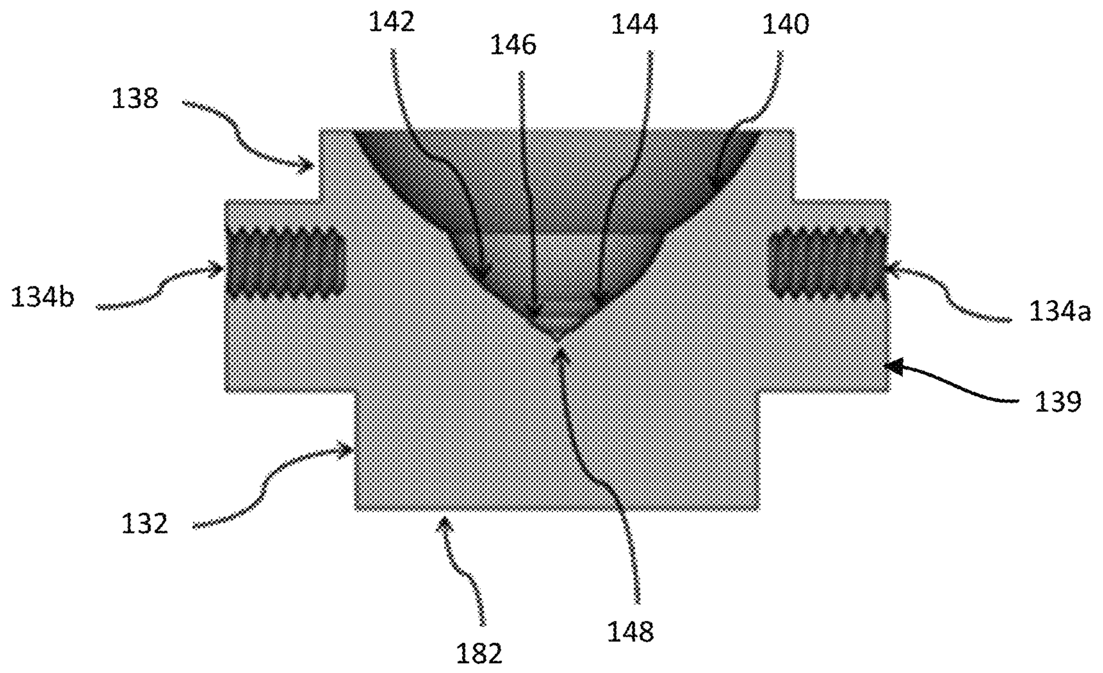
FIG. 29 is a section view of the backing for the embodiment for a piezoelectric transducer illustrated in FIGS. 23-25 and taken along section line 3-3 of FIG. 26.
Figure 30:
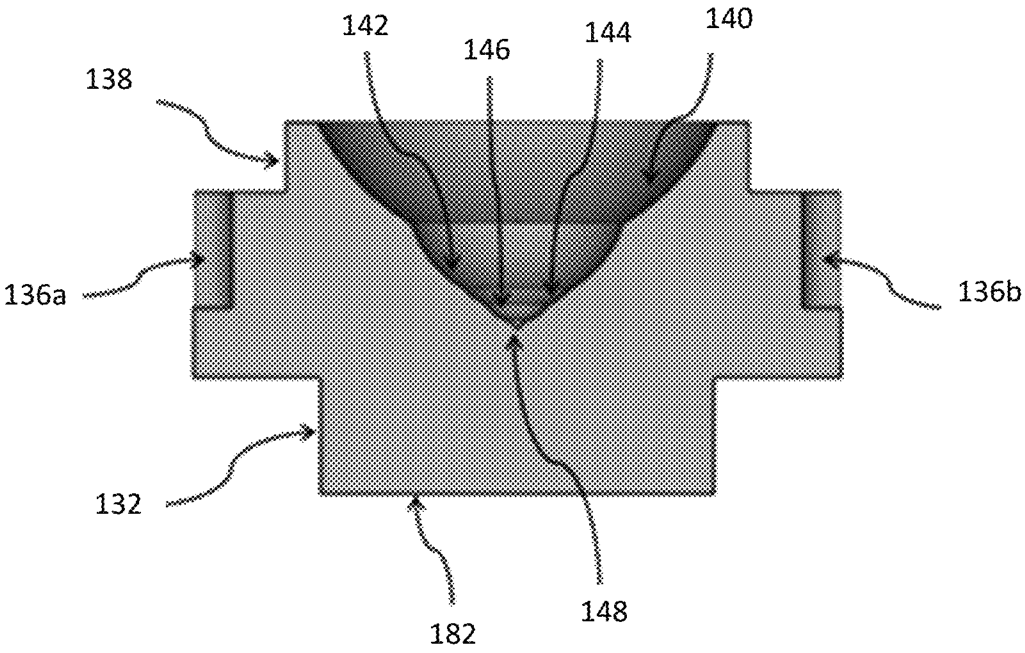
FIG. 30 is a section view of the backing for the embodiment for a piezoelectric transducer illustrated in FIGS. 23-25 and taken along section line 4-4 of FIG. 26.

Referring to FIGS. 26-30, detailed views of embodiments for the backing 130 used in the embodiment for a transducer 100 is shown in various aspects. FIG. 26 is an isometric view of backing 130 for the embodiment for the piezoelectric transducer 100. FIG. 27 is a top view of the backing 130 for the embodiment for piezoelectric transducer 100. FIG. 28 is a bottom view of the backing 130 for the embodiment for piezoelectric transducer 100. FIG. 29 is a section view of the backing 130 taken along section line 3-3 of FIG. 26. FIG. 30 is a section view of the backing 139 for the embodiment for the piezoelectric transducer 100 taken along section line 4-4 of FIG. 26.

The backing 130 material can be made of metal, including but not limited to stainless steel, and can be a cylindrical shaped structure. Although a cylindrical shaped structure for backing 130 is preferred, other shapes may be possible and function according to the embodiments. The backing 130 can by formed with three cylindrical portions: a top end cylindrical portion 138, bottom end cylindrical portion 132, and a mid cylindrical portion 139 that has a larger diameter top end cylindrical portion 138 and bottom end cylindrical portion 132. The front face or bottom surface 182 of backing 130 can be a flat surface for mounting piezoelectric elements. The top end cylindrical portion 138 can include four spherical surfaces 140, 142, 144 and 146, and a cone 148. The radius of the spherical surfaces 140, 142, 144 and 146 and cone 148 can be a variant of the embodiments based on the operation frequency of the transducer 100. The center axial orientation of the spherical surfaces 140, 142, 144 and 146 and cone 148 can be a variant of the embodiments and based on the operation frequency of the transducer 100 and material used for construction of backing 130. The ceramic ball 176 can be the same or nearly the same radius as of the spherical surface 142.

In an embodiment, backing 130 can include two thread holes 134 *a* and 134 *b* that can each receive RF connection rod 180. According to some embodiments, a maximum depth for thread holes 134 *a* and 134 *b* is limited to the diameter of bottom cylindrical portion 132. According to an embodiment, the at least one thread hole or fastening mechanism is necessary to receive the RF connection rod 180. The diameter of thread holes 134 *a* and 134 *b* and RF connection rod 180 can vary according to the embodiments. The backing 130 has two alignment slots 136 *a* and 136 *b*, and their curvature radius can be the same as curvature of the first and second ceramic support balls 174 *a* and 174 *b*. According to one embodiment, the number of alignment slots should be at least two. The alignment slots 136 *a* and 136 *b*, when used with the first and second ceramic support balls 174 *a* and 174 *b* and alignment slots 122 *a* and 122 *b* in the bottom enclosure 112 (referring to FIGS. 37-43) can maintain alignment of the backing 130 when it is moved in and out of the bottom enclosure 112, and also can prevent rotation of backing 130 when the set screw 178 is tightened in order to increase the pressure on a piezoelectric element connected to front surface 182.

Figure 31:
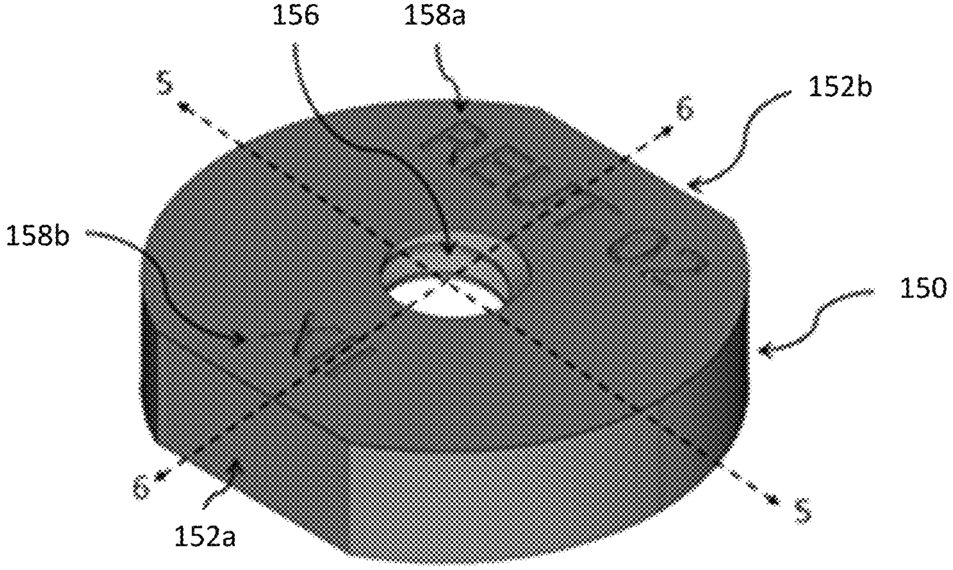
FIG. 31 is an isometric view of the top enclosure for the embodiment for a piezoelectric transducer illustrated in FIGS. 19-21 and FIGS. 23-25.
Figure 32:
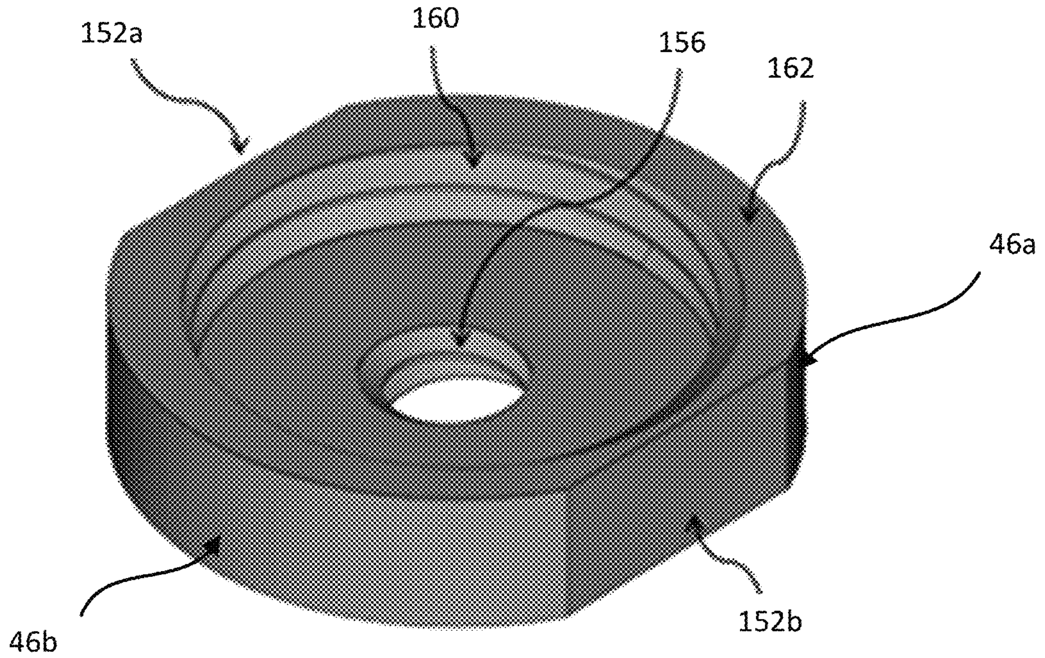
FIG. 32 is an isometric bottom view of the top enclosure for the embodiment for a piezoelectric transducer illustrated in FIGS. 19-21 and FIGS. 23-25.
Figure 33:
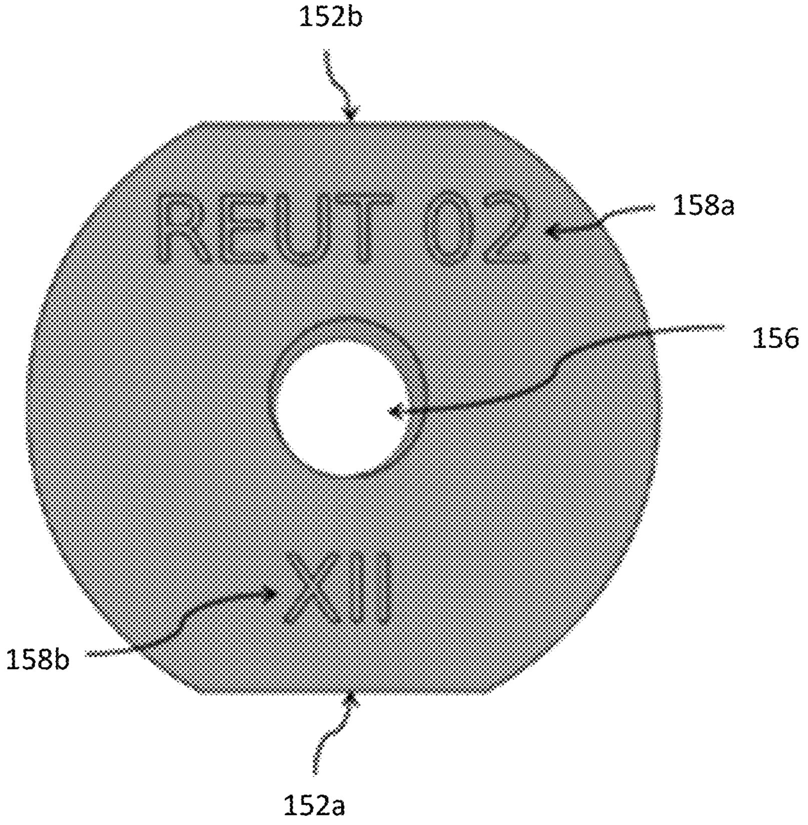
FIG. 33 is a top view of the top enclosure for the embodiment for a piezoelectric transducer illustrated in FIGS. 19-21 and FIGS. 23-25.
Figure 34:
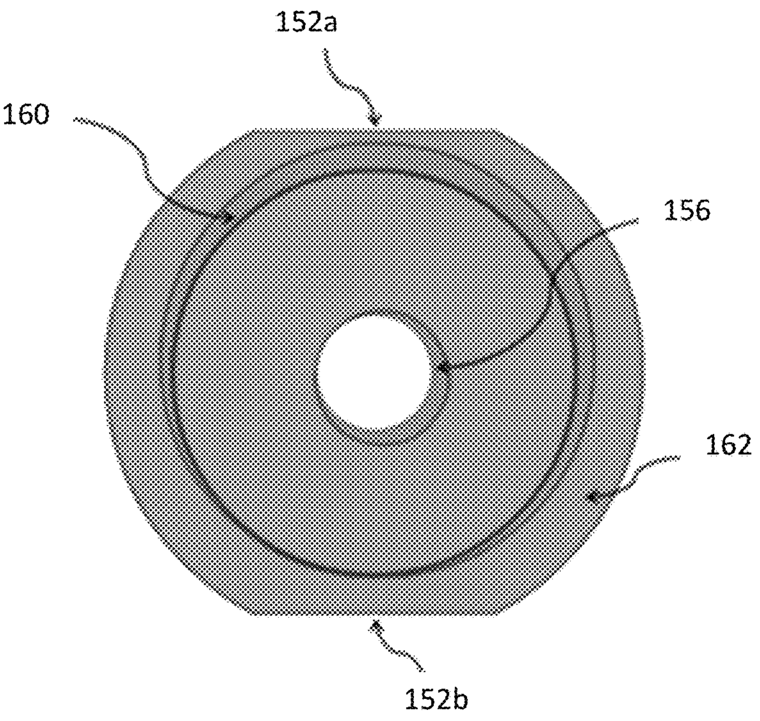
FIG. 34 is a bottom view of the top enclosure for the embodiment for a piezoelectric transducer illustrated in FIGS. 19-21 and FIGS. 23-25.
Figure 35:
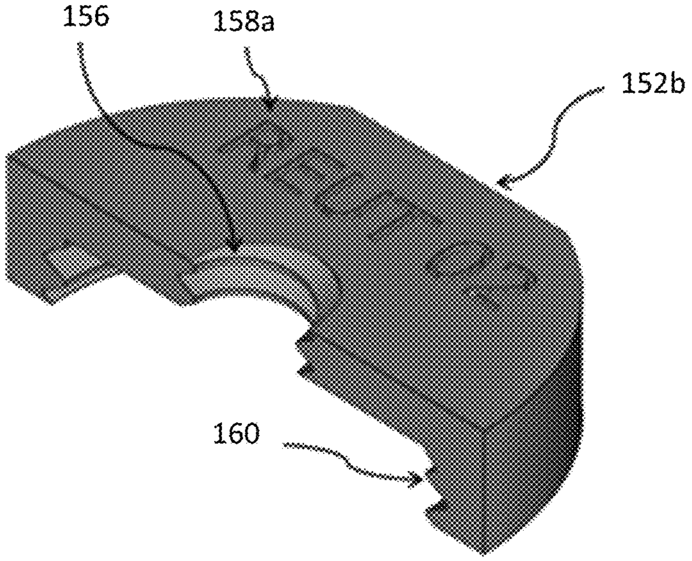
FIG. 35 is a cross-sectional view of the top enclosure of the embodiments taken along line 5-5 of FIG. 31.
Figure 36:
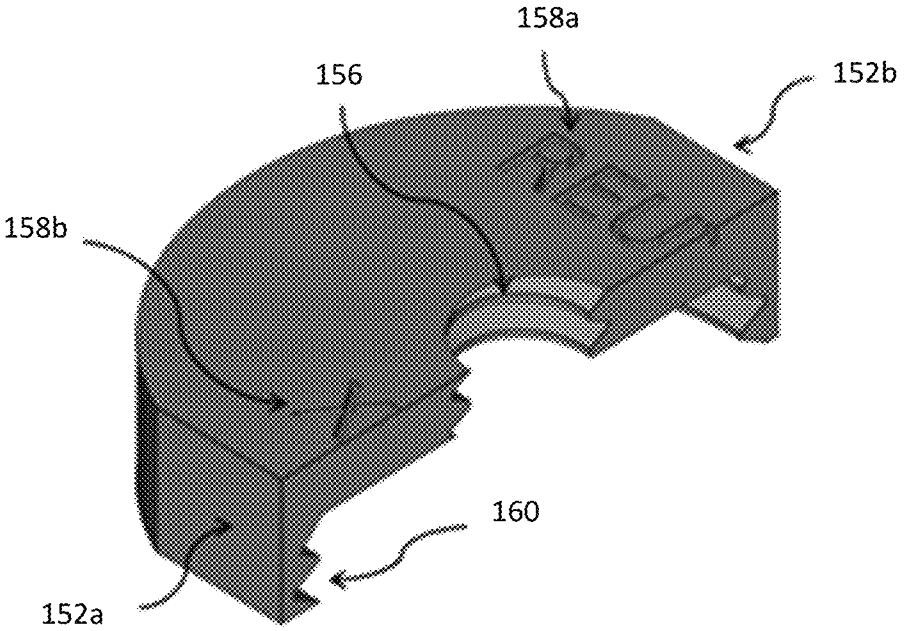
FIG. 36 is a cross-sectional view of the top enclosure of the embodiments taken along line 6-6 of FIG. 31.

Referring to FIGS. 31-36, the detailed view of the top enclosure 150 used in the embodiments is shown. FIG. 31 is an isometric view of an embodiment for the top enclosure 150 for an embodiment for a piezoelectric transducer 100. FIG. 32 is an isometric bottom view of the top enclosure 150. FIG. 33 is a top view of the top enclosure 150. FIG. 34 is a bottom view of the top enclosure 150. FIG. 35 is a cross-sectional view of the top enclosure 150 of the embodiments taken along section line 5-5 of FIG. 31. FIG. 36 is a cross-sectional view of the top enclosure 150 of the embodiments taken along section line 6-6 of FIG. 31.

In an exemplary embodiment, the top enclosure 150 can provide a covering for, as well as mechanical support to apply high pressure from, the backing 130 to add pressure to a piezoelectric element mounted on front surface 182 via the set screw 178. The top enclosure 150 can be a cylindrical-shaped structure, but shapes of the top enclosure 150 may vary with different embodiments. The top enclosure 150 can include the tapped through hole 156 that can receive and guide the set screw 178. The top enclosure 150 can also include mating threads 160, which can mate with bottom enclosure 112 mating threads 118. A bottom end surface 162 of top enclosure 150 can be a flat planar surface that acts as a bottom end of semi-circular walls 164*a* and 164*b*. The top enclosure 150 can also include flat edges 152*a* and 152*b* on distal sides of the perimeter in order to tighten the top enclosure 150 using a tool such as a wrench. An embodiment of top enclosure 150 can have engravings 158*a* and 158*b* to show identifying information of the transducer 100, for example a design version, company information, manufacturing date, etc.

Figure 37:
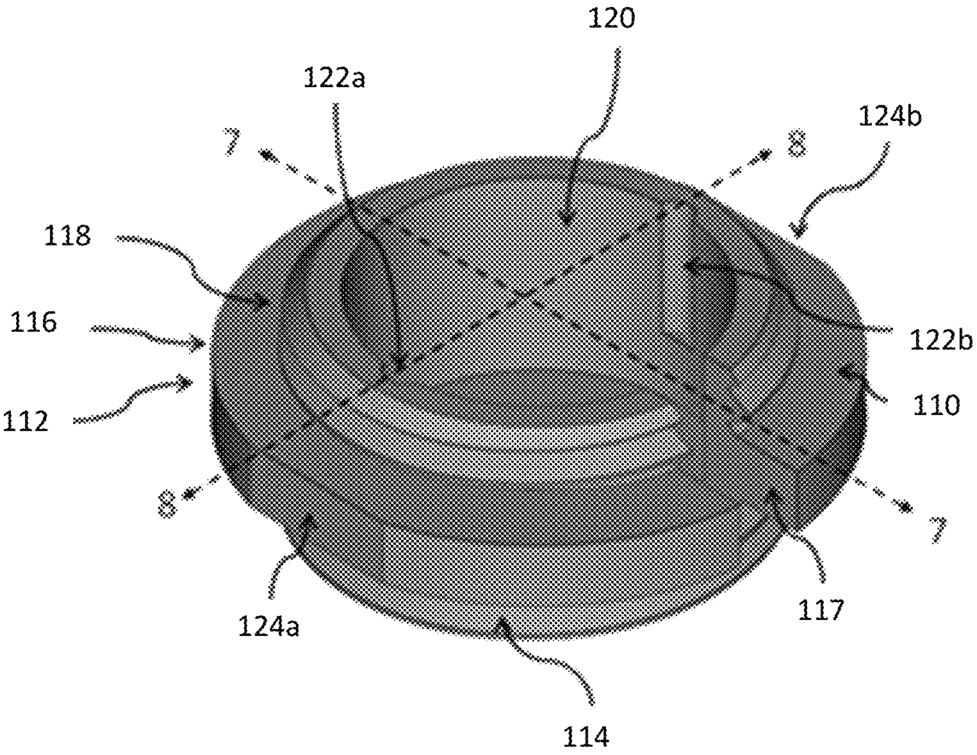
FIG. 37 is an isometric view of the bottom enclosure for the embodiment for a piezoelectric transducer illustrated in FIG. 19-25.
Figure 38:
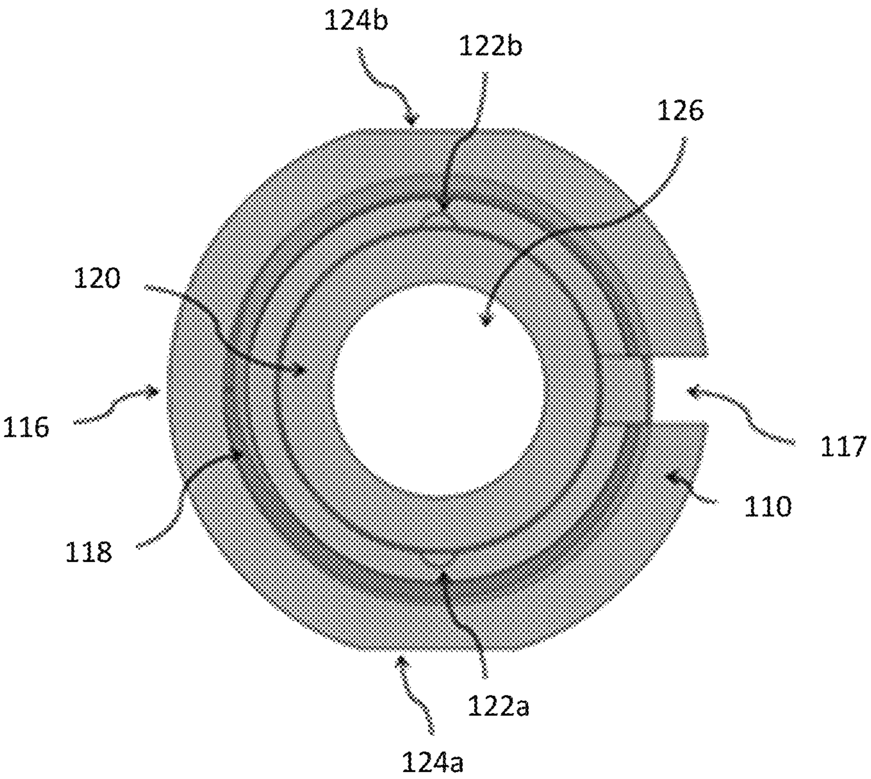
FIG. 38 is a top view of the bottom enclosure for the embodiment for a piezoelectric transducer illustrated in FIG. 19-25.
Figure 39:
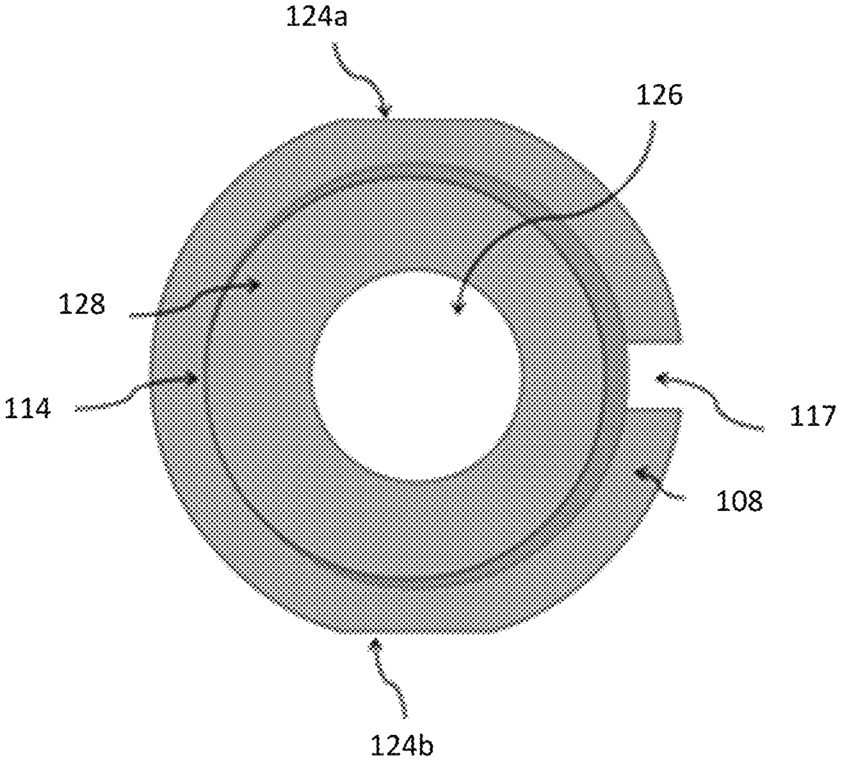
FIG. 39 is a bottom view of the bottom enclosure for the embodiment for a piezoelectric transducer in FIG. 19-25.
Figure 40:
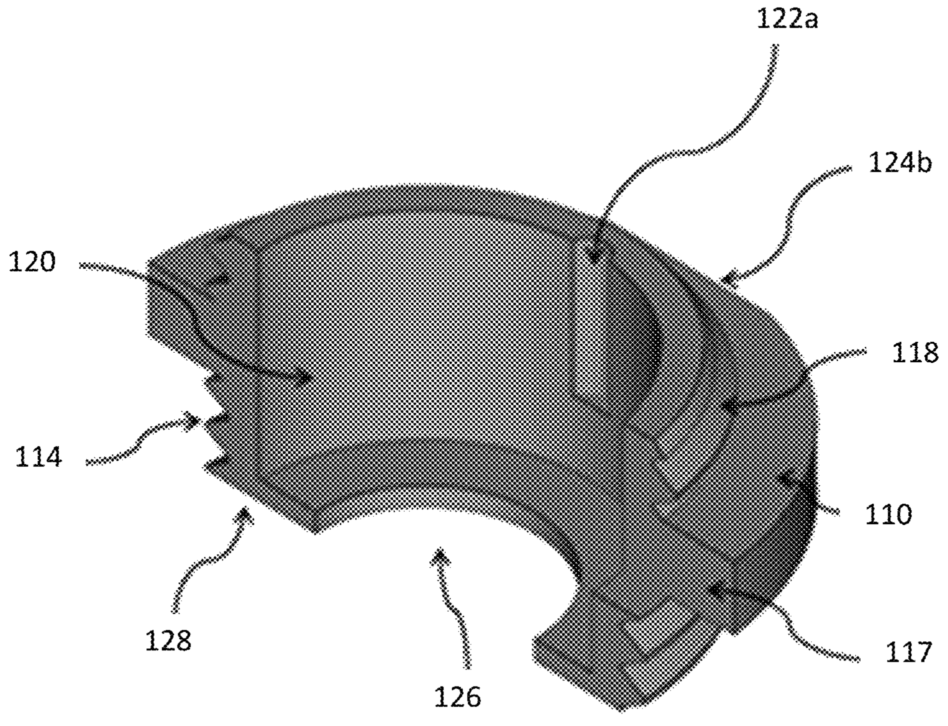
FIG. 40 is a cross-sectional view of the bottom enclosure of the embodiments taken along line 7-7 of FIG. 37.
Figure 41:
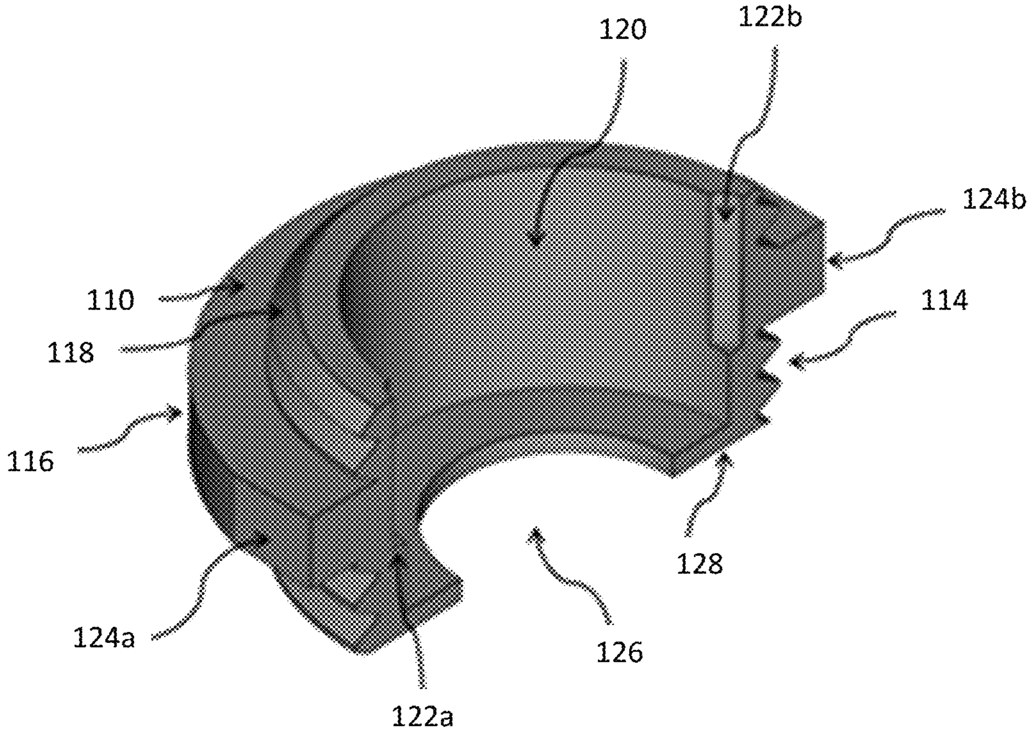
FIG. 41 is a cross-sectional view of the bottom enclosure taken along line 8-8 of FIG. 37.
Figure 42:
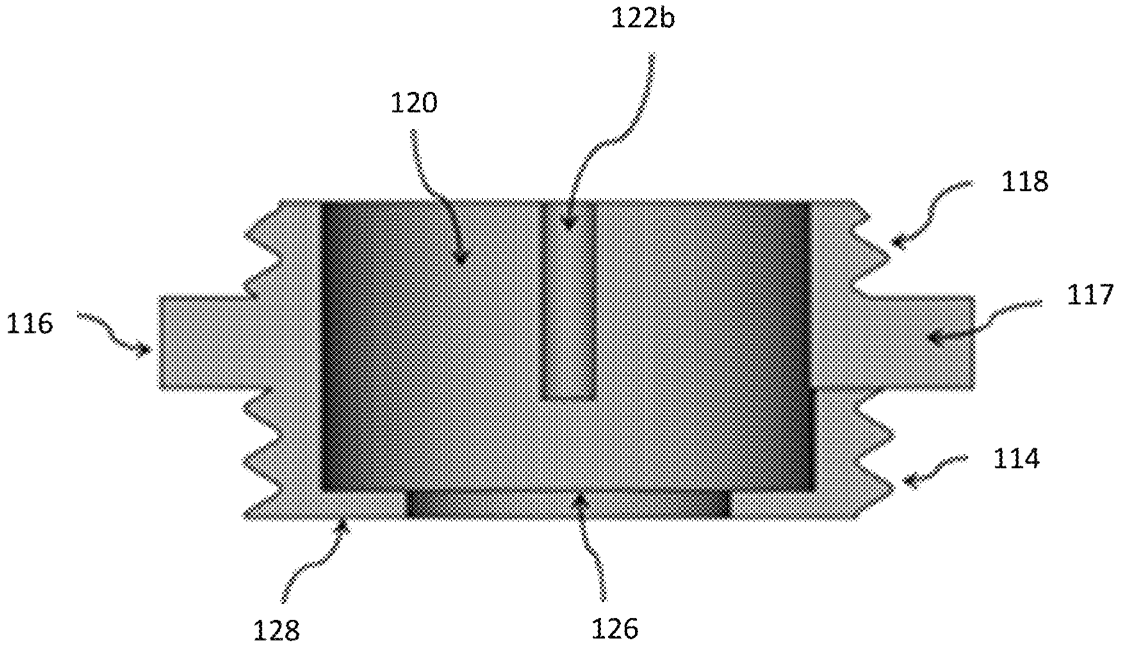
FIG. 42 is a side view of the cross-section of the bottom enclosure of the embodiments taken along line 7-7 of FIG. 37.
Figure 43:
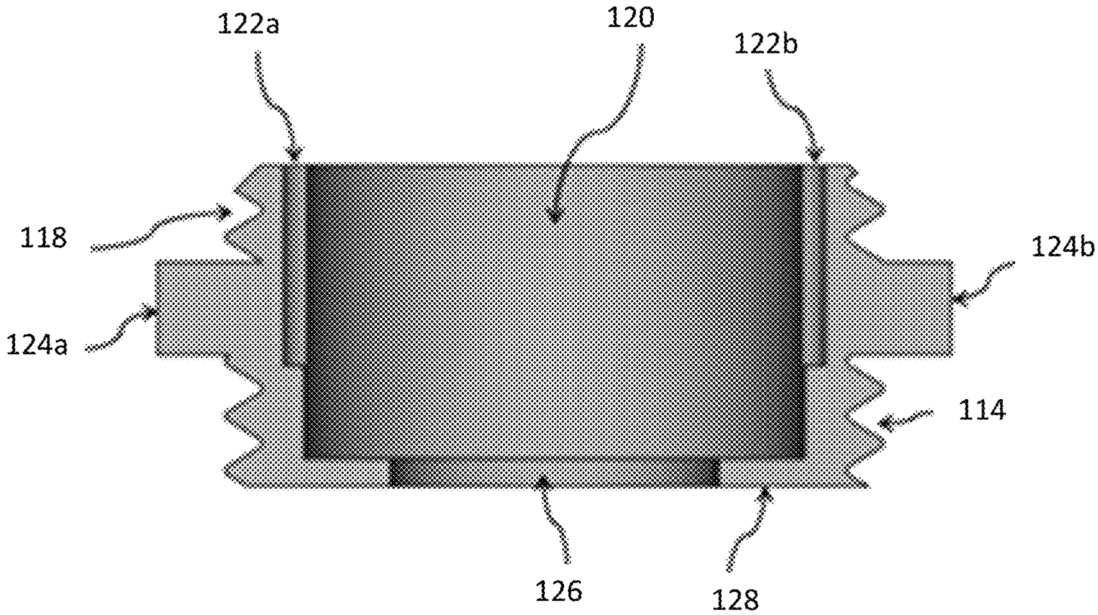
FIG. 43 is a side view of the cross-section of the bottom enclosure of the embodiments taken along line 8-8 of FIG. 37.

Referring to FIGS. 37-43, a detailed view of the bottom enclosure 112 used in the embodiments is illustrated. FIG. 37 is an isometric view of the bottom enclosure 112 for an embodiment of the piezoelectric transducer 100. FIG. 38 is a top view of the bottom enclosure 112, and FIG. 39 is a bottom view of the bottom enclosure 112. FIG. 40 is a cross-sectional view of the bottom enclosure 112 taken along line 7-7 of FIG. 37, and FIG. 41 is a cross-sectional view of the bottom enclosure 112 taken along section line 8-8 of FIG. 37. FIG. 42 is a side view of the cross-section of the bottom enclosure 112 taken along section line 7-7 of FIG. 37, and FIG. 43 is a side view of the cross-section of the bottom enclosure 112 taken along section line 8-8 of FIG. 37. The bottom enclosure 112 can include a cylindrical structure with a cylindrical hollow space 120 defined by a cylindrical wall, a partially closed bottom end except for opening 126, and open at the top end of bottom enclosure 112. In an embodiment, the hollow space 126 can receive and house or partially house exemplary components for the transducer 100 including but not limited to the first ceramic washer 168, second ceramic washer 170, disc spring washer 166, backing 130, ceramic ball 176, first ceramic support ball 174*a*, and second ceramic support ball 174*b*.

The bottom enclosure 112 can include two guiding slots 122*a* and 122*b* with slot radius or size the same as or similar to the alignment slots 136*a* and 136*b* in backing 130. The first ceramic support ball 174*a* can be fit between slots 122*a* and 136*a*. Similarly, the second ceramic support ball 174*b* can fit between slots 122*b* and 136*b* to prevent rotation of backing 130 and can provide a guiding track when the backing is drawn out of the opening 126 in the bottom enclosure 112. The slot 117 can provide clearance for the RF connection rod 100 and ceramic spacer 172. Surface 110 is a flat, planar side of an annular flanged portion 116 of the bottom enclosure 112. In some embodiments, after completion of the transducer 100 assembly the surface 110 of the bottom enclosure 112 may not necessarily be in mechanical contact with the bottom end surface 162 of the top enclosure 150.

In embodiments for the transducer 100 assembly, a mating thread 118 of the bottom enclosure 112 can be received into the mating thread 160 of the top enclosure 150. The bottom enclosure 112 can be formed with flat edges 124*a* and 124*b* on the flanged portion 116 in order to use a tool such as a wrench to tighten bottom enclosure 112 and top enclosure 150 as well as to tighten transducer 100 on the mounting ring 102 to install onto a test structure (not shown). During the transducer 100 assembly process, as well as after transducer installation, the flat edges 152*a* and 152*b* of top enclosure 150 may not align with the flat edges 124*a* and 124*b* of the bottom enclosure 112. On installation of the transducer 100 on the mounting ring 102, a bottom end surface 128 of the bottom enclosure 112 may not be in mechanical contact with a work structure (not shown).

Figure 44:
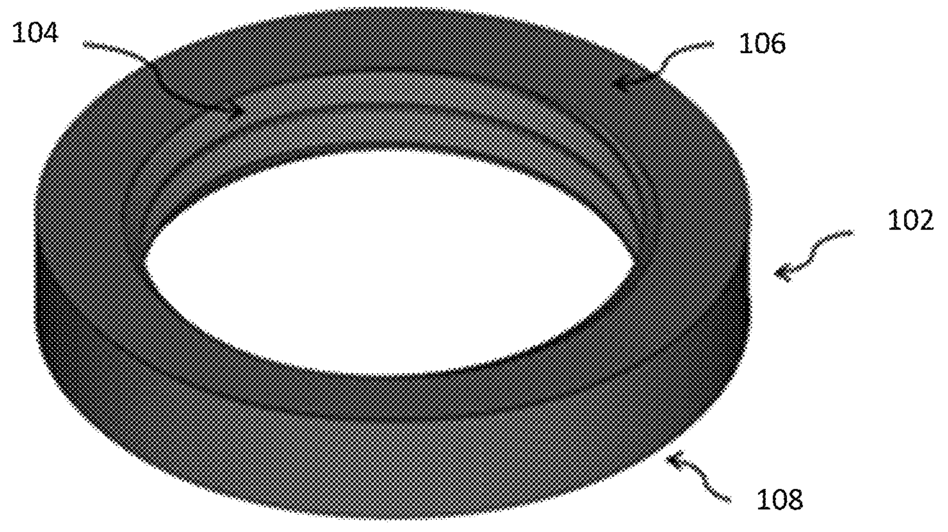
FIG. 44 is an isometric view of the mounting ring of the embodiments illustrated in FIG. 37-43.
Figure 45:
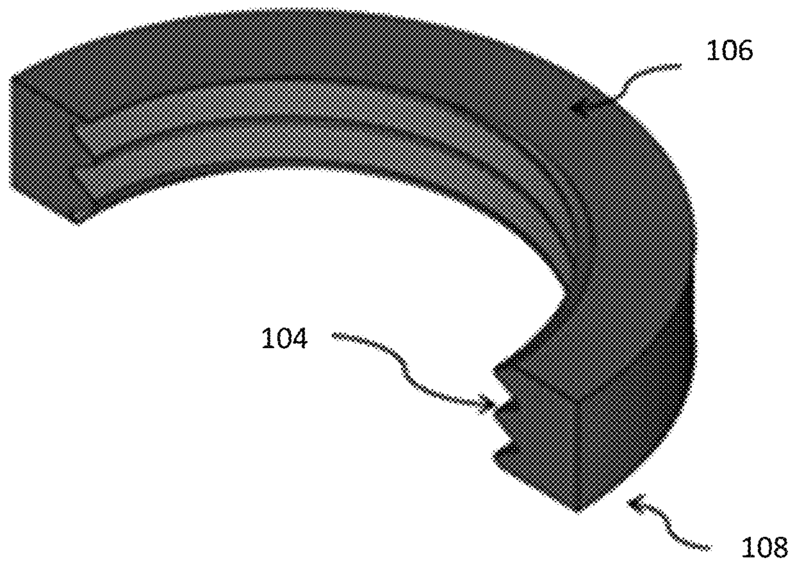
FIG. 45 is a cross-sectional view of the mounting ring of the embodiments illustrated in FIG. 37-43.

FIG. 44 is an isometric view of an exemplary mounting ring 102 of the embodiments for the transducer 100, and FIG. 45 is a cross-sectional view of the mounting ring 102. Referring to FIG. 44 and FIG. 45, the mounting ring 102 can provide a mechanical base for mounting the transducer 100 to an external surface or work structure. In an embodiment, a bottom surface 108 of the mounting ring 102 can be secured or attached to a structure under inspection. Methods of attachment can include but are not limited to welding, fastening, etc. The transducer 100 assembly can be mounted onto the mounting ring using mating threads 104. The mating threads 104 on the mounting ring 102 can mate with mating threads 114 of the bottom enclosure 112. In some embodiments, after installation of the transducer 100 on the mounting ring 102, a top surface 106 of the mounting ring 102 can make contact with the bottom end surface 128 of the bottom enclosure 112.

In the embodiments, mounting of the transducer 100 can include the use of mating threads 114 on the bottom enclosure 112 screwing into mating threads 104 on mounting ring 102, similar to a nut and bolt assembly. To begin, a piezoelectric element such as a wafer should be secured onto the front face 182 surface of backing 130. Then, the transducer 100 with the piezoelectric element attached can be screwed onto the mounting ring 102 using the mating threads 104 and 114. Once the transducer 100 is tightened onto the mounting ring 102, using a tool if necessary, the set screw 178 can also be tightened. Tightening the set screw 178 can push the piezoelectric element out from the hole 126 of the bottom enclosure 112 towards a test structure. A piezoelectric element can make both electrical and mechanical contact with the test structure. A radio frequency connection to the transducer 10 can be established using the RF connection rod 180. The remaining elements of the transducer 100 and in some instances the test structure can act as an RF ground. The pressure over and upon the piezoelectric element towards a test structure can be further increased by tightening the set screw 178, thereby flattening the spring washer 166 until a desirable acoustic signal is achieved.

The operation of the ultrasonic transducer 100 of the embodiments can require a piezoelectric element to be constantly under high pressure, and this required pressure can be provided and maintained by the transducer's 100 design at all temperatures during its operation. The exemplary ultrasonic transducer 100 can eliminate a failure of the bond between a piezoelectric element and a delay block by using the mechanical structure of the transducer 100 to hold all components in place while permitting the piezoelectric transducer 100 to generate pulses of the desired frequency, frequency bandwidth, and pulse width without undesired echoes and/or attenuations. Additionally, the pulse width and attenuation characteristics of the transducer 100 does not reduce at elevated temperatures and remains stable while operating over a long period. Another advantage to the exemplary transducer 100 is that the operator can follow easy methods of installation and maintenance.

The embodiments for a transducer 100 can provide an improved transducer for transmitting and receiving ultrasonic energy for use under high temperatures, high pressure, and in a radiation environment. The superior benefits of the transducer 100 disclosed herein can provide uniform contact pressure between a structure under inspection and a piezoelectric element mounted or attached to the transducer 100. Furthermore, the material choices of manufacture for the transducer 100 and maintaining the contact pressure of the piezoelectric element against a structure using the features of the transducer 100 are important for quality operation at all temperatures and harsh environments. Apart from high-temperature performance, the choice of material and design also ensures long-term operation of the transducer 100 in a high radiation environment.

While the invention has been described with a certain degree of particularity, it is manifest that many changes may be made in detail of construction and the arrangement of components of the embodiments without departing from the spirit and scope of this disclosure. The present embodiments are to be considered as exemplifications of the invention and are not intended to limit the invention to the specific embodiments herein illustrated by the figures or description above.

What is claimed is:

1. An ultrasonic transducer comprising:

a backing comprising a central indented cone portion, a central flanged portion, and a bottom portion below an indented cone portion including a front face of the bottom portion positioned perpendicular to a center axis of a cone portion, and a hole formed along a lateral axis from an outer wall of the backing and extending partially into a backing wall, wherein the front face of the bottom portion is configured to receive a piezoelectric element;

a top enclosure that can partially receive the backing, wherein the top enclosure includes a through-hole through the center axis;

a bottom enclosure, that can partially receive the backing;

a set screw configured to be received through the top enclosure through-hole; and a ball configured to be received into at least a part of the cone portion, wherein, the top enclosure and bottom enclosure are each configured to fix against the backing central flanged portion, and when fixed, the set can make contact with the ball.

2. The ultrasonic transducer of claim 1, further comprising:

a mounting ring configured to connect to a lower portion of the bottom enclosure.

3. The ultrasonic transducer of claim 2, wherein a tightening of the set screw onto the ball pushes a front surface of the backing partially into the bottom enclosure.

4. The ultrasonic transducer of claim 1, further comprising:

a spring washer positioned between the central flanged portion of the backing and an internal flanged portion of the bottom enclosure.

5. The ultrasonic transducer of claim 4, further comprising:

a second ceramic washer positioned between the central flanged portion of the backing and the spring washer.

6. The ultrasonic transducer of claim 4, wherein, when the set screw is loosened, the spring washer retracts the backing inside the first enclosure and the second enclosure.

7. The ultrasonic transducer of claim 1, further comprising:

a first ceramic washer positioned between the top enclosure and the central flanged portion of the backing.

8. The ultrasonic transducer of claim 1, further comprising:

a radio frequency connection rod configured to be received the backing.

9. The ultrasonic transducer of claim 8, wherein the radio frequency connection rod establishes an electrical connection to the backing.

10. The ultrasonic transducer of claim 9, wherein the radio frequency connection rod is electrically isolated from the top enclosure and the bottom enclosure.

* * * * *